(12) United States Patent
Murayama et al.

(10) Patent No.: US 7,987,328 B2
(45) Date of Patent: Jul. 26, 2011

(54) DATA ARCHIVE SYSTEM

(75) Inventors: Tomonori Murayama, Yokohama (JP);
Yoichi Mizuno, Yokohama (JP)

(73) Assignees: Hitachi, Ltd., Tokyo (JP); Hitachi Computer Peripherals Co., Ltd., Kanagawa-ken (JP)

( * ) Notice: Subject to any disclaimer, the term of this patent is extended or adjusted under 35 U.S.C. 154(b) by 400 days.

(21) Appl. No.: 12/331,598

(22) Filed: Dec. 10, 2008

(65) Prior Publication Data

US 2010/0103549 A1    Apr. 29, 2010

(30) Foreign Application Priority Data

Oct. 23, 2008  (JP) ................................. 2008-273048

(51) Int. Cl.
*G06F 12/00* (2006.01)
*G06F 11/14* (2006.01)

(52) U.S. Cl. ........... 711/162; 714/E11.08; 714/E11.118; 360/15

(58) Field of Classification Search .......................... None
See application file for complete search history.

(56) References Cited

U.S. PATENT DOCUMENTS

| | | | | | |
|---|---|---|---|---|---|
| 4,158,235 A | * | 6/1979 | Call et al. ........................ | 710/56 |
| 4,755,928 A | * | 7/1988 | Johnson et al. ............. | 714/38.14 |
| 5,835,953 A | * | 11/1998 | Ohran ........................... | 711/162 |
| 6,490,648 B1 | * | 12/2002 | Kaneda et al. ................ | 711/111 |
| 7,529,784 B2 | * | 5/2009 | Kavuri et al. .................. | 709/217 |
| 2004/0117398 A1 | * | 6/2004 | Idei et al. ....................... | 707/102 |
| 2006/0123207 A1 | * | 6/2006 | Yamamoto et al. ........... | 711/161 |
| 2007/0079099 A1 | * | 4/2007 | Eguchi .......................... | 711/170 |
| 2007/0103984 A1 | * | 5/2007 | Kavuri et al. ............. | 365/185.17 |
| 2007/0266204 A1 | * | 11/2007 | Mizuno ......................... | 711/111 |
| 2008/0091896 A1 | * | 4/2008 | Usami ........................... | 711/162 |
| 2009/0222453 A1 | * | 9/2009 | Naineni ......................... | 707/10 |

FOREIGN PATENT DOCUMENTS

JP  2007-305075  11/2007

* cited by examiner

*Primary Examiner* — Reginald G Bragdon
*Assistant Examiner* — Daniel J Bernard
(74) *Attorney, Agent, or Firm* — Antonelli, Terry, Stout & Kraus, LLP.

(57) ABSTRACT

In a virtual disk library device access of data stored in a tape can be conducted at a high speed with a high-speed archiving process from a disk to the tape in units of LUs maintained. The efficiency of update of the data stored in the tape can be improved. In this system, when the data stored in the tape is to be accessed with a high-speed archiving process in units of LUs from the disk to the tape maintained, a disk staging process is performed in the unit of a page that is smaller than the unit of an LU, and accordingly, high-speed access can be implemented. In addition, when an update process for the data (LU) stored in the tape is performed, the host can be responded by only staging an update target page of the LU, and a prior disk staging process is performed for the remaining pages of the LU in the background. Accordingly, when the data is re-stored in the tape, immediately storing the data in the tape can be performed without performing a staging process.

10 Claims, 18 Drawing Sheets

FIG. 7

| VIRTUAL LUN 510 | SIZE 520 | STORAGE DESTINATION TG NUMBER 530 | LOGICAL ADDRESS 540 | PAGE NUMBER 550 | SEGMENT NUMBER 560 |
|---|---|---|---|---|---|
| 01 | 2TB | — | 0-999 | 1 | 11 |
|  |  |  | 2000-2999 | 3 | 1 |
|  |  |  | 3000-3999 | 4 | 3 |
|  |  |  | 5000-5999 | 6 | 31 |
|  |  |  | ... |  | ... |
| 02 | 2TB | 10 |  |  |  |
| 03 | 500GB | 11 | 2000-2999 | 3 | 22 |
|  |  |  | 3000-3999 | 4 | 14 |
|  |  |  | 4000-4999 | 5 | 32 |
| ... |  | ... | ... |  | ... |

FIG. 8

| VIRTUAL LUN | PAGE NUMBER | STATUS | DATA STATE |
|---|---|---|---|
| 0001 | 1 | ACTIVE | ACCORD |
| | 2 | INACTIVE | ACCORD |
| | 3 | UNASSIGNED | ACCORD |
| | 4 | ACTIVE | DISCORD |
| | ... | ... | ... |
| 0002 | 1 | UNASSIGNED | ACCORD |
| | 2 | UNASSIGNED | ACCORD |
| | ... | ... | ... |
| ... | ... | ... | ... |

FIG. 9

| PAGE 1 | PAGE 2 | PAGE 3 | PAGE 4 | PAGE 5 | PAGE 6 | PAGE 7 | PAGE 8 | PAGE 9 |
|---|---|---|---|---|---|---|---|---|
| PAGE 10 | PAGE 11 | ... | | | | | | |
| | | | | | | | | |
| | | | | | | | | |
| | | | | | | | | |
| | | | | | | | | |

| TG NUMBER | FILE MARK INTERVAL | TAPE NUMBER | STORAGE LUN | LU CAPACITY [GB] | PURGE FLAG |
|---|---|---|---|---|---|
| 0001 | 8 | 00001 | 0001 | 500 | 0 |
| | | | 0002 | 300 | 0 |
| | | 00002 | 0002 | 200 | 0 |
| | | | 0003 | 400 | 0 |
| 0002 | 8 | 00003 | 0004 | 600 | 0 |
| 0003 | 8 | 00004 | 0005 | 200 | 1 |
| | | | 0006 | 400 | 0 |
| ... | ... | ... | ... | ... | ... |

| REGISTRATION TG NUMBER | USE FLAG |
|---|---|
| 0001 | 1 |
| 0002 | 1 |
| 0003 | 1 |
| 0004 | 1 |
| 0005 | 1 |
| 0006 | 0 |
| 0007 | 0 |
| ... | ... |

| DIRECTORY | STORAGE FILE SYSTEM | PATH NAME | DIRECTORY CAPACITANCE [GB] | FREE CAPACITY [GB] | TAPE STORAGE THRESH-OLD VALUE | LUN |
|---|---|---|---|---|---|---|
| dir01 | FS001 | /root/dir01 | 1600 | 100 | 0.9 | 1 |
| dir02 | FS001 | /root/dir02 | 1600 | 1000 | 0.9 | 2 |
| dir03 | FS001 | /root/dir03 | 1600 | 1600 | 0.9 | 3 |
| ... | ... | ... | ... | ... | ... | ... |

Columns: 1110, 1120, 1130, 1140, 1150, 1160, 1170

| FILE | STORAGE FILE SYSTEM | PATH NAME | LATEST ACCESS TIME |
|---|---|---|---|
| file001 | FS001 | /root/dir01 | 2007/05/11 04:05:06 |
| file002 | FS001 | /root/dir01 | 2007/05/11 04:08:08 |
| file003 | FS001 | /root/dir01 | 2007/05/15 04:05:06 |
| file004 | FS001 | /root/dir02 | 2007/05/20 12:05:16 |
| file005 | FS001 | /root/dir02 | 2007/05/20 08:05:08 |
| file006 | FS001 | /root/dir02 | 2007/05/11 04:10:06 |
| file007 | FS001 | /root/dir02 | 2007/05/25 22:05:06 |
| file008 | FS001 | /root/dir02 | 2007/06/20 04:05:06 |
| ... | ... | ... | ... |

Columns: 1210, 1220, 1230, 1240

DATA ARCHIVE SYSTEM

CROSS REFERENCES TO RELATED APPLICATIONS

This application relates to and claims priority from Japanese Patent Application No. 2008-273048, filed on Oct. 23, 2008, the entire disclosure of which is incorporated herein by reference.

BACKGROUND OF THE INVENTION

1. Field of the Invention

The present invention relates to technology for archiving data in a tape, and more particularly, to a virtual disk library device having a disk array device and a tape library device.

2. Description of the Related Art

Virtual disk library devices (systems) include a random access-type device such as a magnetic disk device (hereinafter, referred to as a disk) and a sequential access-type device such as a magnetic tape device (hereinafter, referred to as a tape) therein. The virtual disk library devices can copy or move data between a disk and a tape (represented by "disk-tape" or the like), as is needed.

Such technology has been disclosed, for example, in JP-A-2007-305075.

SUMMARY OF THE INVENTION

However, electronic data to be stored for a long time has increased due to legal regulations and the like. In order to store high-capacity data for a long time, for example, a tape is advantageous over a disk in terms of costs. The reason is that generally, the bit cost (cost per one bit) of the tape is lower than that of the disk. Thus, by storing old data that is scarcely accessed not in the disk but in the tape, the cost for storing the data can effectively decrease.

A case where data is not accessed for a predetermined period can be a momentum for archiving (storing) data from the disk to the tape. In such a case, according to the technology disclosed in JP-A-2007-305075, data copy between the disk and tape (from disk to tape) is performed in units of LUs (logical disk devices). Accordingly, in the case, the data copy process can be performed at a high speed.

However, in a case where data stored in the tape is needed to be accessed (read or written), the data can be accessed after performing a disk staging process (a process for staging (copying) data from the tape to the disk) in units of LUs. Accordingly, for example, when the capacity (size) of the LU is large, the time needed for copying (disk staging) the data becomes long, and thus, there is a problem that a long time is needed for accessing the data stored in the tape.

In such a case, when the capacity of the LU is large, several hours or more may be required for performing the disk staging (copying) process. Thus, for example, by only extending a time-out period at a time when the data stored in the tape is accessed (for example, read) from a host (a host system or a host computer), a read command from the host cannot be processed (received and responded). The above-described time-out period is a time period corresponding to an ordinary disk access response, and when the tape is accessed, a time more than that for accessing the disk is needed. Thus, the time-out period for access is extended, for example, by designation or setting of the host for the time-out period.

Thus, in such a case, for example, before access from the host is made, the disk staging in the units of LUs for the data stored in the tape is needed to be completed by using a disk staging directing command (disk staging process) or the like. Otherwise, the read command from the host cannot be received and responded.

As one solution for the above-described problem, data copy between the disk and tape in units of files may be considered to be performed. However, in such a case, the performance decreases due to the overhead for handling the file.

In addition, since the medium as the archive destination is the tape that is a sequential access-type device, only a part of the tape cannot be overwritten (updated). Accordingly, in order to update the data stored in the tape, after data is staged on the disk from the tape in units of LUs and the data on the disk is updated, the updated data is needed to be copied to the tape in units of LUs. As a result, it takes a long time for performing the update process.

The present invention is contrived in consideration of the above-described problems. The major object of the invention relates to a computer system (information processing system) such as a virtual disk library device. First, the object of the invention is to provide technology that allows access of the data stored in the tape at a high speed with the high-speed archiving process from the disk to the tape in units of LUs (in units of storage areas having a large size) maintained. Second, the object of the invention is to provide technology capable of improving the efficiency of update (update reflection) of the data stored in the tape. Furthermore, the object of the invention is to provide technology capable of reducing the load of the host for the data copy process between the disk and the tape.

Among embodiments of the present invention disclosed here, an overview of a major embodiment will be described as below. In order to achieve the above-described objects, a major embodiment of the invention implements technology for archiving data in a computer system that is configured by a disk array device (storage device) having a plurality of disks, a tape library device having a plurality of tapes, a virtual disk library device having the disk array device and the tape library device, a computer (host system) that accesses (reads or writes) data thereof, and the like. The embodiment of the invention includes the configuration described below as its features.

According to the above-described embodiment of the invention, when data stored in a tape is to be accessed with a high-speed archiving (moving or copying (writing)) data in units of LUs (a storage area unit having a large size) from a disk (a RAID group or the like) to a tape (a tape group or the like), high-speed access for the data stored in the tape can be implemented by performing a disk staging process (copying (reading) data from the tape to the disk) in units of pages (a storage area unit having a small size) that are smaller than the units of LUs.

Accordingly, a disk staging direction and a disk staging process before access to the data stored in the tape are not needed. For example, the host completes its operation only by simply issuing an access command for accessing the data stored in the tape. In addition, for example, by extending the time-out period to, for example, several minutes (or setting the time-out period to a predetermined period shorter than that generally used), also for the data stored in the tape, it is possible to receive a read command or the like from the host and respond to the host without any problem.

In addition, by performing the above-described process in units of LUs and pages instead of handling a file in the process, the load of the host can be reduced by performing data copy between the disk and the tape in the virtual disk library device not through the host.

When data update is performed for the data stored in the tape (for example, when data is written by the host), not a unit of the LU but only a page to be updated is staged on the disk from the tape, and the host is immediately responded. In addition, in the background thereof or the like, remaining pages (a part that is not updated) of the LU are staged on the disk from the tape (according to general technology, such a prior staging process is not performed). Accordingly, when the data is needed to be stored (update reflection) in the tape again, the data can be effectively stored (copied) in the tape in units of LUs without performing a disk staging process (a new direction is issued by the host or the like, and a disk staging process is performed in the unit of the LU). As a result, update and reflection for the data can be implemented effectively.

In addition, according to another embodiment of the invention, in a system including a virtual disk library device having a virtual volume function and a host, a high-speed archiving process is performed for the virtual volume from the disk to the tape in units of LUs. In addition, when the data (a page of the virtual volume) stored in the tape is accessed from the host, staging the data from the tape to the disk in units of pages can be performed. Accordingly, high-speed access for the data from the host can be implemented.

According to the above-described embodiment, there is provided a data archive system (computer system), for example, including a host computer and a storage control device (a virtual disk library device or the like) used by the host computer. The storage control device, which a first-type storage device group (for example, disks) that is a random access type and a second-type storage device group (for example, tapes) that is a sequential access type are built in or connected to, performs: a process for setting one or more logical storage areas (LUs) in which data can be stored in one or more of the first-type storage devices; a process for setting a group (for example, a tape group) in which data of the logical storage area can be stored in one or more of the second-type storage devices; and a process for providing the host computer a virtual volume, which has a virtual size larger than that of the LU, configured by units of a plurality of pages that have a predetermined size smaller than that of the units of the logical storage areas.

Then, the storage control device performs a process for managing the logical storage areas to be in correspondence with the virtual volume and managing the first real storage area (a segment) of the logical storage area of the first-type storage device side or the second real storage area of the group of the second-type storage device side to be in correspondence with pages of the virtual volume as a real storage area.

Then, the storage control device performs: a first process (inactivation process) for moving or copying (archiving) the data of the virtual volume in the units of the logical storage areas from the first real storage area of the logical storage area of the first-type storage device side to the second real storage area of the group of the second-type storage device side in accordance with predetermined determination or a predetermined direction (an inactivation command, access from the host, or the like); and a second process (activation process) for moving or copying (staging) the data of the real storage area of the virtual volume in the units of the logical storage areas from the second real storage area of the group of the second-type storage device side to the first real storage area of the logical storage area of the first-type storage device side in accordance with predetermined determination or a predetermined direction (an activation command, access from the host, or the like).

Then, the storage control device performs a third process for reading out data from an area of the second real storage area of the group of the second-type storage device side corresponding to a page including target data in the units of the pages to be in the first real storage area of the logical storage area of the first-type storage device side and responding to the host computer in a case where the target data for access is stored on the second-type storage device side when an access command for reading or writing the data of the virtual volume is received from the host computer.

Then, in the above-described system, the storage control device automatically performs a fourth process (prior staging process) for reading out data from an area of the second real storage area of the group of the second-type storage device side corresponding to remaining pages of the logical storage area other than the page including the target data to be in the first real storage area of the logical storage area of the first-type storage device side, in the background of or after the third process without any intervention of the host.

Then, in the above-described system, the storage control device performs a fifth process for storing data in the units of the logical storage areas including updated pages in the second real storage area of the group of the second-type storage device side at a time when the data of the virtual volume updated by the host computer in accordance with the third process or access thereafter is to be stored again in the second real storage area of the second-type storage device side from the first real storage area of the first-type storage device side, triggered by predetermined determination or a predetermined direction, without any intervention of the host after performing the fourth process.

The advantages that can be acquired from the major embodiment of the invention disclosed here will be described briefly as below. The major embodiment of the invention relates to a computer system such as a virtual disk library device. First, according to the major embodiment, access for the data stored in the tape can be performed at a high speed with the high-speed archiving process from the disk to the tape in units of LUs maintained. Second, according to the major embodiment, the efficiency of update (update reflection) for the data stored in the tape can be improved. Furthermore, the load of the host for performing the data copy process between the disk and the tape can be reduced.

In particular, for storing (archiving) data to the tape, data is stored at a high speed in units of LUs as in general technology. On the other hand, when the data stored in the tape is accessed from the host, data can be staged on the disk in units of pages (update target pages) that are smaller than the units of LUs, and the host can be responded. Accordingly, response for the host can be made at a speed higher than that of general technology. In addition, when the data stored in the tape is updated (update reflection), the host is responded by staging only the update target page of the LU, and a prior staging process is performed for the remaining pages in the background. Accordingly, re-storing (update reflecting) the data in the tape can be efficiently performed. In addition, for performing the data copy process between the disk and the tape, intervention of the host such as issue of a staging direction is not needed, and accordingly, the load of the host can be reduced.

BRIEF DESCRIPTION OF THE DRAWINGS

FIG. 5A represents archiving, a virtual volume, and the like, and FIG. 5B represents a disk staging process.

FIG. 6A represents an update process and a prior staging process, and FIG. 6B represents re-storing data in a tape.

FIG. 7 is a diagram representing an example of the configuration of a virtual volume management table.

FIG. 8 is a diagram representing an example of the configuration of a virtual volume-page management table.

FIG. 9 is a diagram representing an example of the configuration of a page mapping bit map.

FIG. 11 is a diagram representing an example of the configuration of a TG management table.

FIG. 12 is a diagram representing an example of the configuration of a TG pool management table.

FIG. 13 is a diagram representing an example of the configuration of a file system management table.

FIG. 14 is a diagram representing an example of the configuration of a file management table.

DETAILED DESCRIPTION OF PREFERRED EMBODIMENT

Hereinafter, embodiments of the present invention will be described in detail with reference to drawings. In all of the diagrams for describing the embodiments, basically, a same reference sign is assigned to a same unit, and a repetitive description thereof is omitted. When a program or a function is a subject in description, actually, a process is performed by a processor or a circuit that executes the program.

Embodiment 1

A computer system (a data archive system that is configured to include a virtual disk library device) according to Embodiment 1 of the present invention will now be described with reference to FIGS. 1 to 19.

Figure 3:
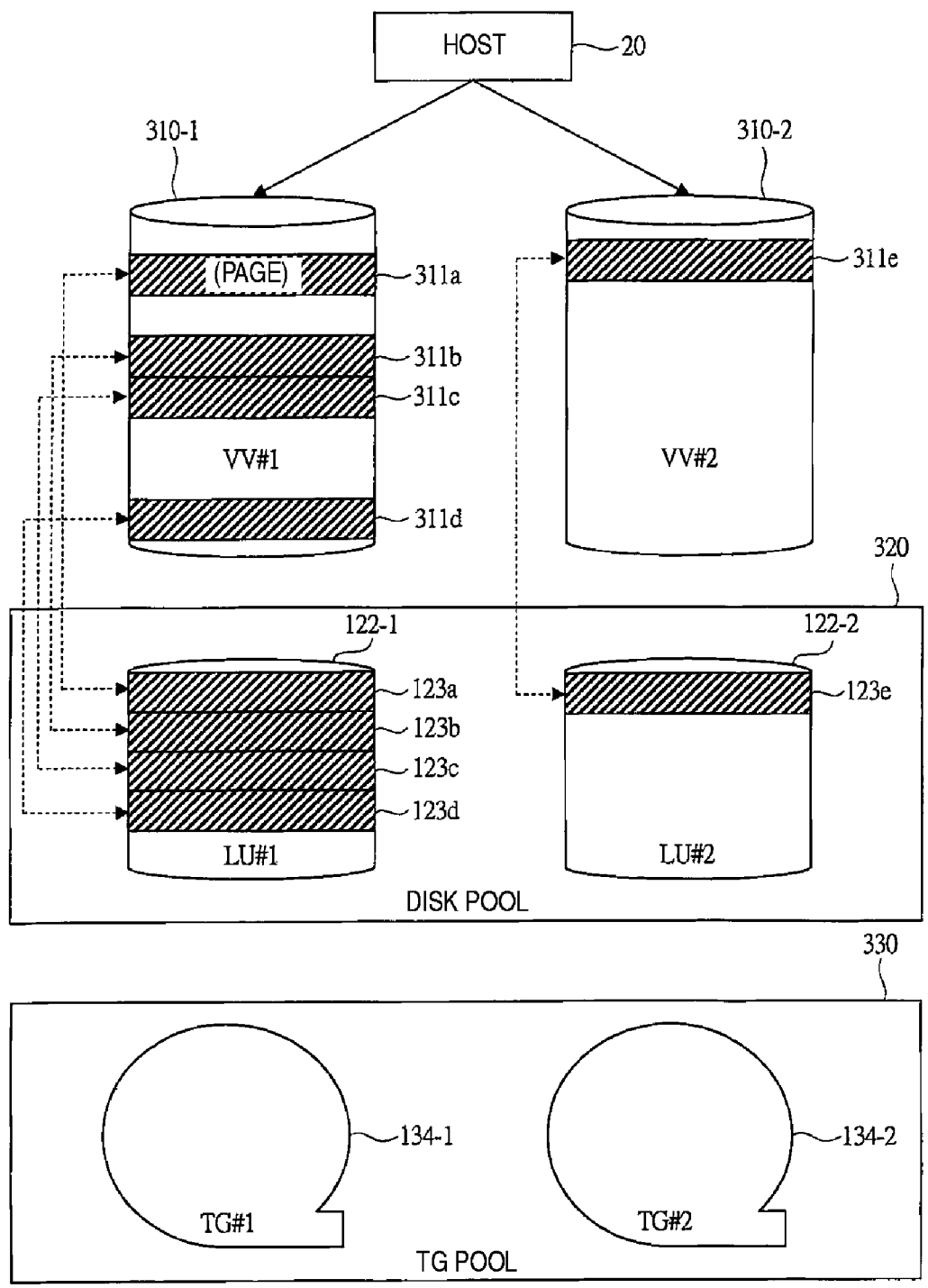
FIG. 3 is a diagram representing relationship of virtual volumes, disk pools, and TG pools.
Figure 4:
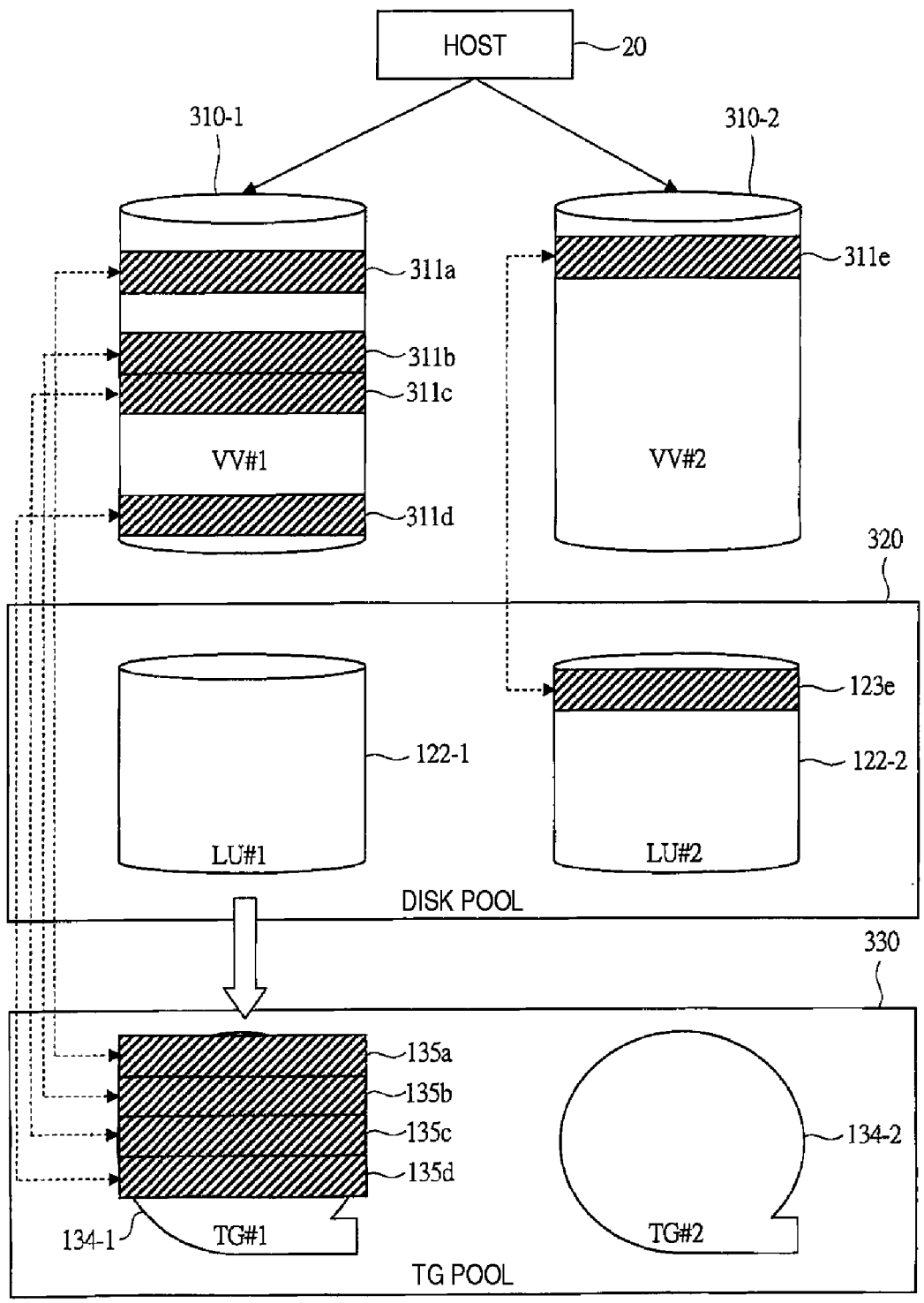
FIG. 4 is a diagram representing another relationship of virtual volumes, disk pools, and TG pools.
Figure 5A:
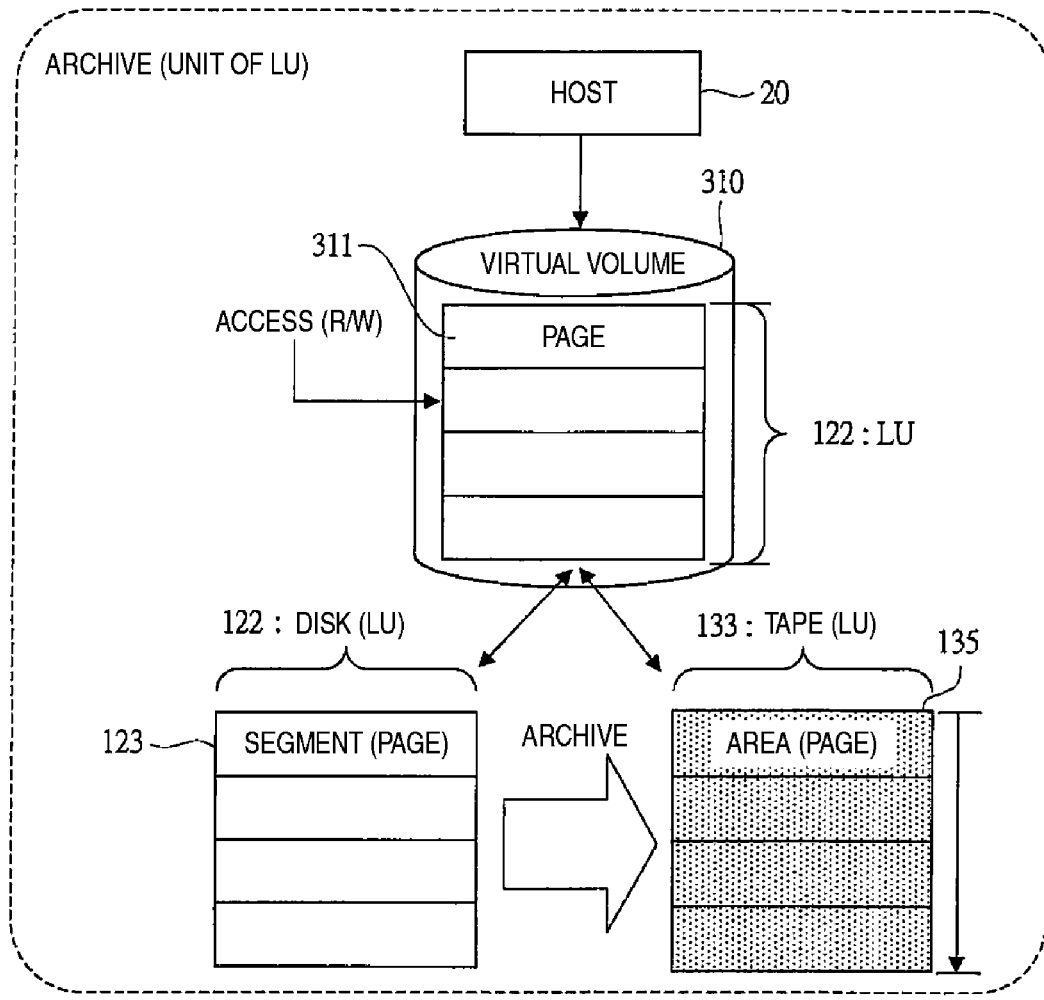
FIGS. 5A and 5B are diagrams representing major aspects and processes of the computer system.
Figure 5B:
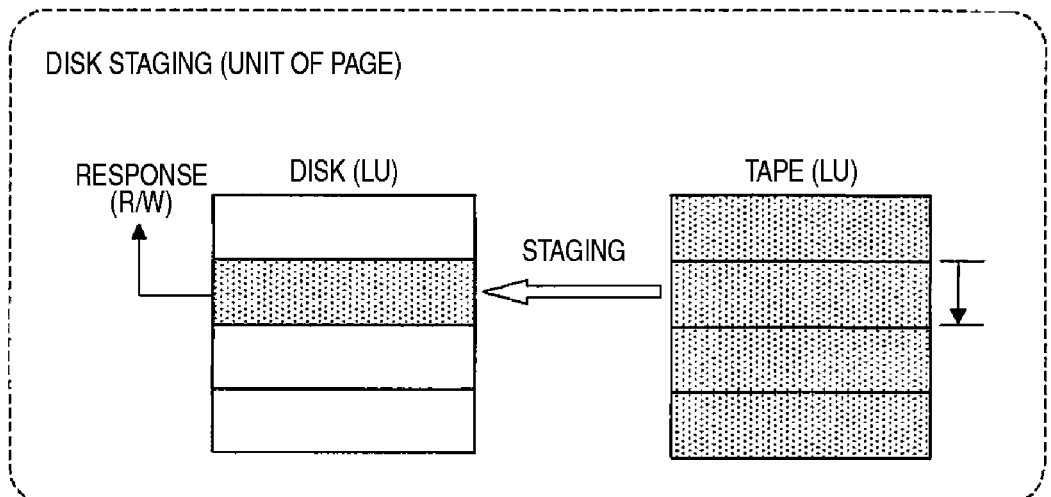
Figure 6A:
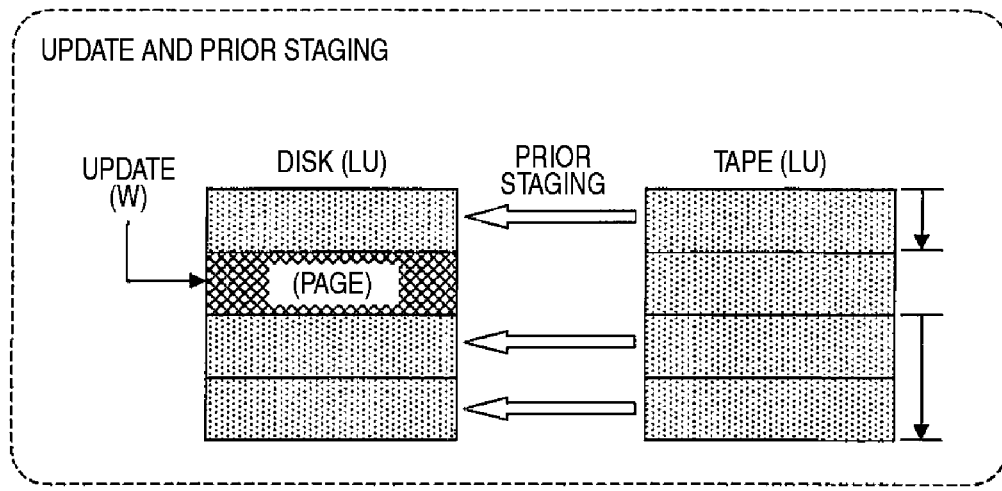
FIGS. 6A and 6B are diagrams representing major aspects and processes of the computer system.
Figure 6B:
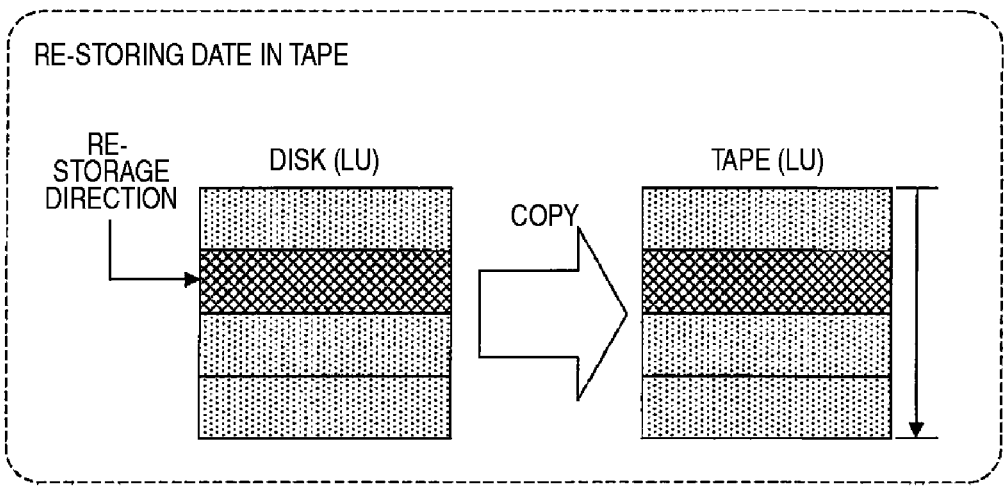

According to Embodiment 1, as an overview, in a system in which a virtual disk library device 10 including a disk array device 120 and a tape library device 130 is connected to a host 20 (FIG. 1), a controller 110 of the virtual disk library device 10 has a function for supplying a virtual volume 310 to the host 20 (FIGS. 3 and 4). A process (an inactivation or activation process) of moving or copying data between a disk and a tape in the virtual volume 310 is managed in units of LU units and page units. For data movement from the disk 122 to the tape 133, an archiving process is performed at a high speed in units of LUs 122 (FIG. 5A). When tape-stored data is accessed, data from the tape 133 to the disk (LU) 122 is staged to be processed in units of the pages 311 (135), so that a response for the host 20 can be made at a high speed (FIG. 5B). In addition, in the background thereof, a prior staging process is performed for the remaining pages 135 of the LU 122 (FIG. 6A). In addition, in a process for updating the tape-stored data, a response can be made at a high speed in accordance with completion of the prior staging process for the LU 122 (FIG. 6A). In addition, in a process for storing data (update reflected) again in the tape, a process can be performed at a high speed in units of the LUs 122 (FIG. 6B).

System

Figure 1:
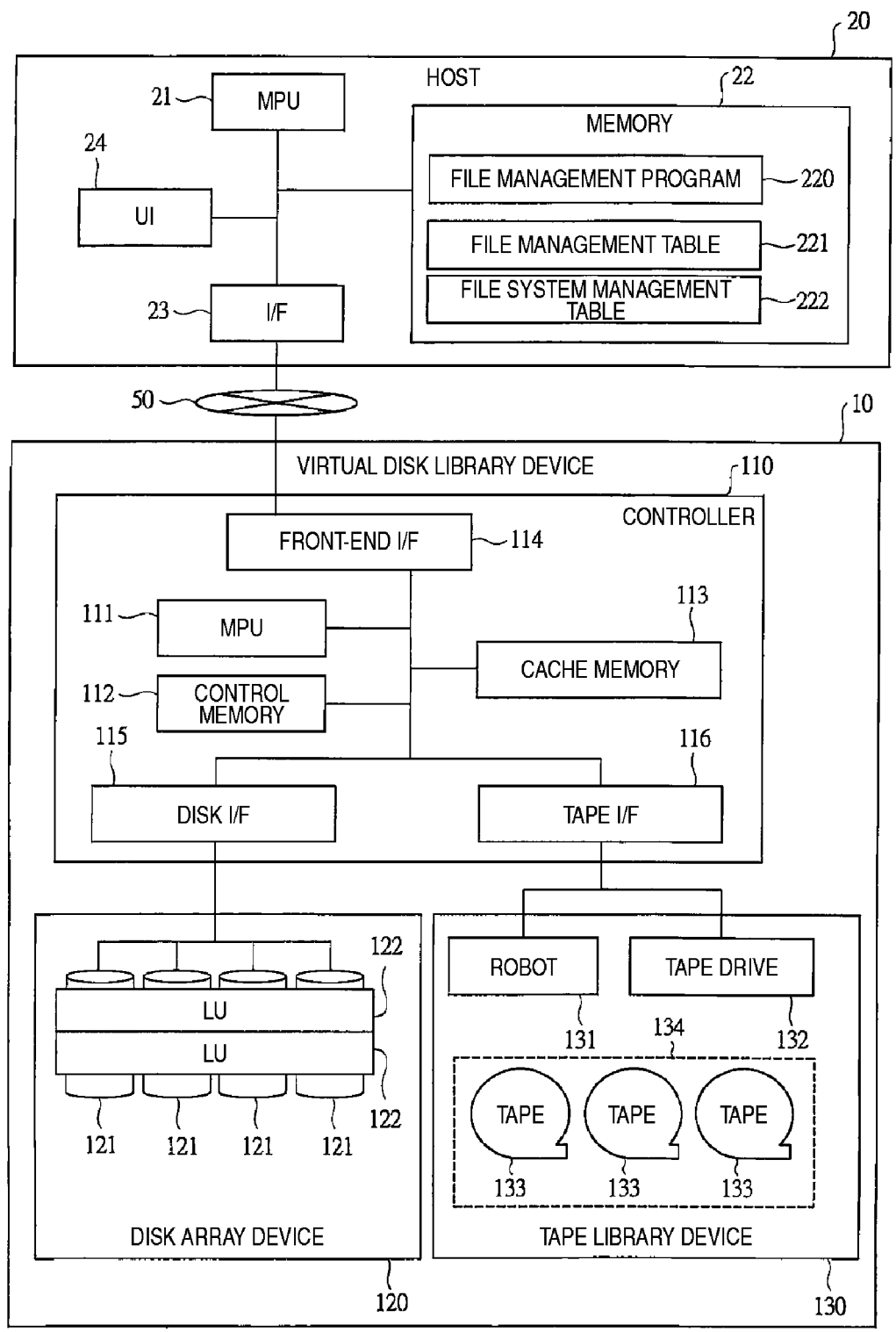
FIG. 1 represents an example of the configuration of a computer system according to Embodiment 1 of the present invention.

FIG. 1 represents an example of the configuration of the computer system according to Embodiment 1 of the present invention. The computer system has a configuration in which the host (host system) 20 and the virtual disk library device (storage control device) 10 are connected to each other though a fibre channel (network) 50. The host 20 and the virtual disk library device 10 transfer data, process request, or the like therebetween through the fibre channel 50. The host 20 and the virtual disk library device 10 may be connected through a communication network such as a LAN or may be connected through a dedicated line or the like.

The host 20 is one computer system (a PC, a server, a mainframe computer, or the like) that is used by a user. The host 20, for example, may be configured to include a processor such as a microprocessor (MPU) 21, a memory 22, a communication interface (I/F) 23, and a user interface (UI) 24.

In the memory 22, for example, a file management program 220 and a file management table 221 and a file system management table 222 that are managed by the file management program 220 are stored. Although programs such as various driver software and the like are stored in the memory 22, these are omitted in the figure.

The file management program 220 stored in the memory 22 is read and executed by the MPU 21. In addition, the file management program 220 can issue an inactivation command or an activation command.

The virtual disk library device 10 is configured to include a controller (control device) 110, a disk array device 120, and a tape library device 130. These devices 110, 120, and 130 may be embodied in a same casing or may be embodied in separate casings.

The controller 110 controls the operation of the virtual disk library device 10. The controller 110, for example, includes a microprocessor (MPU) 111, a control memory 112, a cache memory 113, a front-end communication interface (front-end I/F) 114, a disk interface (disk I/F) 115, and a tape interface (tape I/F) 116.

Figure 2:
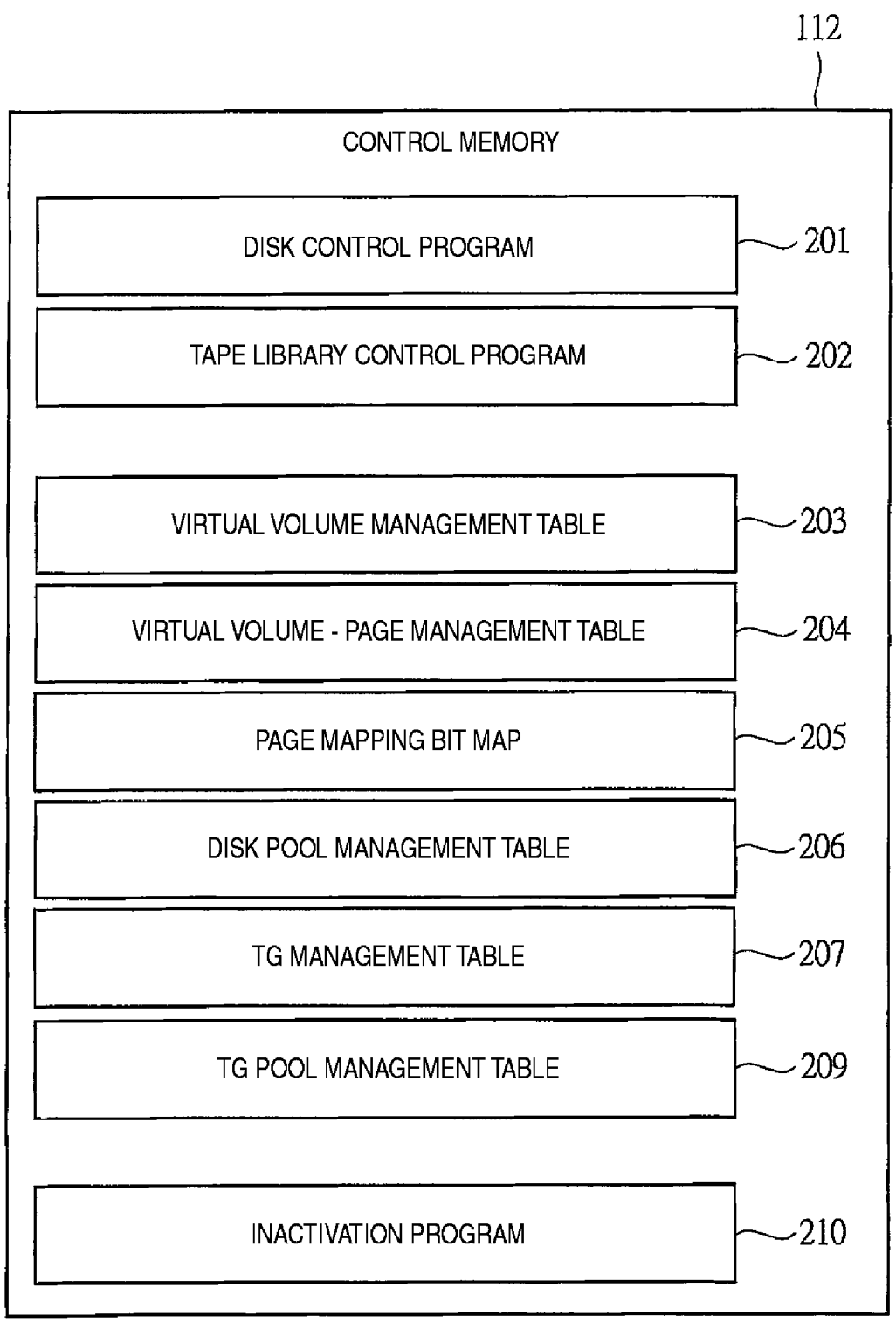
FIG. 2 is a diagram representing an example of programs and the like that are stored in a control memory of a controller of a virtual disk library device.

As represented in FIG. 2, in the control memory 112, various programs 201, 202, 210, and 211 and various tables 203, 204, 205, 206, 207, and 209 are stored. In the control memory 112, for example, a disk control program 201, a tape library control program 202, a virtual volume management table 203, a virtual volume-page information table 204, a page mapping bit map 205, a disk pool management table 206, a TG (Tape Group) management table 207, a TG pool management table 209, and an inactivation program 210 are stored.

By the MPU's 111 reading and executing the program (201, 202, 210, or the like), a function (virtual volume function) of generating the virtual volume 310 and supplying the virtual volume to the host 20, a function (activation or inactivation) of copying or moving data between the disk and the tape, or the like is implemented.

In the cache memory 113, write data received from the host 20, data read out from a disk 121 (LU 122) of the disk array device 120, data read out from the tape 133 of the tape library device 130, and the like are appropriately stored (cached). The cache memory 113 is commonly used by constituent units.

The front-end I/F 114 is an interface used for communicating with the host 20 side. The front-end I/F 114, for example, corresponds to the fibre channel. The disk I/F 115 is an interface used for communicating (inputting or outputting data) with the disk 121 (LU 122) of the disk array device 120. The disk I/F 115 corresponds to an RAID. The tape I/F 116 is an interface used for communicating (inputting or outputting data) with the tape 133 of the tape library device 130.

The disk array device 120 includes a plurality of HDDs (hard disk drives) 121 (hereinafter, the HDD is also simply referred to as a disk). A RAID group can be configured by organizing physical storage areas of the disks 121 as one. In the physical storage area of the RAID group, the LU 122 having a fixed size or a variable size can be provided. Alternatively, one or a plurality of LUs 122 may be configured in the physical storage area of one disk 121. The LU 122 is a logical storage area (also referred to as a logical unit, a logical volume, or the like). The LU 122 is managed by the controller 110.

As described above, the HDD (disk) 121 is represented as an example of a random access-type storage device. However, the random access-type storage device is not limited thereto and may be another type of device such as a flash memory device. In addition, for example, a configuration in which the HDD and the flash memory device are mixed may be used.

The tape library device 130, for example, includes a robot 131, a tape drive 132, and a plurality of tapes (magnetic tape devices) 133. The plurality of tapes 133 may configure a tape group (TG) 134. The robot 131 controls movement of the tapes 133. The robot 131 performs an operation for setting the tape 133 in the tape drive 132 and an operation for taking the tape 133 out of the tape drive 132 and keeping the tape 133 in a predetermined location. The tape drive 132 performs an operation for writing data into the tape 133 and an operation for reading data from the tape 133. The tape 133 is one example of a sequential access-type storage device that stores data in a magnetic tape area.

Virtual Volume

FIGS. 3 and 4 are schematic diagrams of virtual volumes 310 that are included in the virtual disk library device 10. FIG. 3 represents correspondence between the virtual volumes 310 and disks. FIG. 4 represents correspondence (change of the correspondence from the disk to the tape) between the virtual volumes 310 and tapes in correspondence with FIG. 3.

The virtual volume 310 is a virtual storage volume appearing to the host 20. The entity (real storage area) of data of the virtual volume exits on the disk 121 (the LU 122 or the disk pool 320) side or the tape 133 (the TG 134 or the TG pool 330) side.

The disk control program 201 has a virtual volume function that enables the virtual volume 310 to appear to the host 20 side (for example, the file management program 220) by using the management information 203, 204, 205, 206, 207, and 209. As the virtual volumes 310 (denoted by VV), for example, VV#1 (320-1) and VV#2 (320-2) are represented. Here, #numbers are identification numbers used in a case where a plurality of units of a same type exits. For example, VV#1 represents a first virtual volume.

The disk pool 320 is an aggregation of the disks (HDD) 121 that is managed by the disk control program 201 as a pool by using the disk pool management table 206. The disk pool 320 has LUs 122 that are set on the disks 121. As the LUs 122, for example, LU#1 (122-1) and LU#2 (122-2) are represented.

The TG pool 330 is an aggregation of the tapes 133 that is managed by the disk control program 201 (the tape library control program 202) as a pool by using the TG pool management table 209. The TG pool 330 has a TG 134 that is configured by a plurality of the tapes 133. The TG 134 is a set in which the tapes 133 of a required number are grouped to be usable for performing data copy (archive) from the disk 121 to the tape 133. As the TGs 134, for example, TG#1 (134-1) and TG#2 (134-2) are represented.

The virtual volume 310 can have a plurality of address ranges (pages). One address range is referred to as a page. For example, VV#1 (310-1) shown in FIG. 3 includes pages 311a, 311b, 311c, and 311d as the pages. In addition, VV#2 (310-2) includes a page 311e.

To each of the plurality of address ranges (pages) of the virtual volume 310, an unused segment of a plurality of segments (the physical storage area, the first real storage area) constituting the disk 121 (the corresponding LU 122) of the disk pool 320 is assigned in accordance with an access (for example, read (R) or write (W)) for the address range. The physical storage area of the disk 121 side is denoted as a segment (page) 123 of the disk 121 (LU 122) (FIGS. 5A and 5B).

For example, a page 311a of VV#1 (310-1) shown in FIG. 3 is in correspondence with a segment 123a of a corresponding disk 121 of LU#1 (122-1). Similarly, pages 311b, 311c, and 311d of VV#1 are in correspondence with segments 123b, 123c, and 123d of LU #1, respectively. In addition, a page 311e of VV#2 is in correspondence with a segment 123e of LU#2. The assignment (correspondence) is managed by a table to be described later.

In addition, as shown in FIG. 4, in the inactivation process (function), for example, data (data of LU#1 shown in FIG. 3) of the virtual volume 310-1 (VV#1) is copied (archived) to TG 134, for example, to TG 134-1 (TG#1) in units of LUs 122 at a high speed. After the copy process is completed, the segments (pages) 123a, 123b, 123c, and 123d of LU#1 (122-1) shown in FIG. 3 are released from VV#1 (310-1) and can be reassigned (used) to another virtual volume 310.

Then, the pages 311a to 311d of VV#1 (310-1) are changed to be in correspondence with continuous tape areas (the physical storage area, the second real storage volume) 135a, 135b, 135c, and 135d of TG#1 (134-1) (a corresponding tape 133) shown in FIG. 4. The physical storage area of the tape 122 side is denoted as an area (page) 135 of TG134 (LU 122) (FIGS. 5A and 5B).

As described above, the real storage area (physical storage area) assigned to the virtual volume 310 (the page 311) is one between the segment (page) 123 of the disk 121 (LU 122) or an area (page) 135 of TG 134 (LU 122). The host 20 can use the virtual volume 310 regardless of the difference therebetween. To the host 20, as the size (capacity) of the virtual volume 310, a size (virtual size) that is equal to or larger than the real size is provided. The real size is a total size of the real storage areas that are assigned to the virtual volume 310.

When the host 20 writes data into a page 311, which is vacant, of the virtual volume 310, the disk control program 201 assigns a segment 123 of the LU 122 to the page 311. In addition, the disk control program 201 has a function for controlling the LU 122.

The tape library control program 202 is a program that controls the tape library device 130. In addition, the inactivation program 210 has a function for performing an inactivation process in which data of the disk 121 (LU 122) is copied into the tape 133 (TG 134) in units of LU 122, in cooperation with the disk control program 201 and the tape library control program 202. When data is copied between the disk 121 (LU 122) and the tape 133 (TG 134), the inactivation program 210 and the like are performed. The tape library control program 202 is appropriately called and executed by the inactivation program 210 as is needed. In the inactivation process, the tape library control program 202 is used for wiring data into an area of the tape 133 and reading data from the area of the tape 133. For the simplification of descriptions below, a description for calling the tape library control program 202 and the like are omitted.

When the sizes of units are compared with one another, approximately, virtual volume>LU>page.

Aspects

The basic aspects and process (function) of this system will now be described as below. The process will be described in detail later.

The host 20 can access the virtual volume LU in a form corresponding to a file and a directory. In particular, the host 20 performs a tape storage determining process (that is, the inactivation determining process, FIG. 15). The controller 110 has a virtual volume function, an LU control function, and the inactivation and activation function. The controller 110 performs the inactivation process (FIG. 16). In addition, the controller 110 performs a reading process (FIG. 17) for the tape storage data and the like, a write process (FIG. 18), a prior staging process for the host access data (FIG. 19), and the like. The controller 110 performs a process for caching data of the virtual volume by appropriately using the cache memory 113 in transferring the data of the virtual volume between the disk and the tape.

Here, the inactivation process is for setting the data to be in the inactive state (the tape storage state), and the activation process is for setting the data to be in the active state (the disk storage state). The inactivated state is advantageous for storage cost and the like, and the active state is advantageous for the access efficiency and the like.

FIG. 5A represents archiving (inactivating) data from the disk 121 to the tape 133 in units of the LUs, the virtual volume 310, and the like. The LU 122 and each page 311 of the virtual volume 310 in which data accessed (Read or Write) from the host 20 is stored corresponds to each other. When the inactivation process is performed, for the data of the virtual volume 310, data of each segment 123 of the disk 121 side is copied (archived) to an area 135 of the tape 133 (TG134) side in units of the LUs 122. The operation for copying (writing) data into the tape area is sequentially performed. The operation for copying data between the disk and the tape is performed by the disk I/F 115, the tape I/F 116, and the like. At that moment, the cache memory 113 may be used, and the operation of the host 20 is not needed to intervene in the copy operation.

FIG. 5B represents a staging (disk staging) process from the tape 133 to the disk 121 in units of pages. When the virtual volume 310 is accessed from the host 20, data corresponding to a page 311 included in access target data of the corresponding LU 122 is read out from the area (page) 135 corresponding to the tape 133 (TG 134) on the disk 121 (or the cache memory 113) (staging). Then, a response is immediately made for the host 20 by using the data of the read-out page 311. When the tape storage data is accessed (Read or Write) from the host 20, for example, a time-out period is designated by a command such that the time-out period is longer than that of a case where the disk is accessed. Alternatively, a predetermined time-out period may be set in advance by the system. Accordingly, the command from the host 20 is received by the controller 110, and the process can be normally performed within the time-out period.

FIG. 6A represents an update (writing) process of the host 20 for data corresponding to a page 311 of the disk 121 (LU 122) and a prior staging process for data of the remaining pages 311 of the LU 122. As shown in FIG. 5B, data of the access target page of the LU 122 is staged. However, in the background thereof, that is, at a simultaneous timing or at a timing right after the staging process, data of the remaining pages of the LU 122 is read out from the tape area on the disk (or the cache memory 113) (the prior staging).

FIG. 6B represents storing (update reflected) the data (FIG. 6A) of the updated LU 122 on the disk 121 into the tape again. The data (FIG. 6A) of the updated LU 122 on the disk 121 exists on the disk 121 side in the active state in accordance with the access (Read or Write) from the host 20. Then, when a re-storing direction is issued from the host 20, the data is not accessed for the time being, or the like, the data is re-stored (that is, update reflected) to the tape 133 side to be in the inactive state. When only a specific page is updated for storing data again, storing (sequential writing) data into the tape in units of the LUs is needed to be performed. However, since the prior staging process (FIG. 6A) is performed in advance, storing (copying) data into the tape area can be performed immediately in units of the LUs.

Next, various management information will be described.

Virtual Volume Management Table

FIG. 7 represents an example of the configuration of the virtual volume management table 203. The virtual volume management table 203 manages each segment (page) 123 and the like that are assigned to the virtual volume 310 as a real storage area. The virtual volume management table 203, for example, records a virtual LUN 510, a size 520, a storage destination TG number 530, a logical address 540, a page number 550, and a segment number 560 for each virtual volume 310.

The virtual LUN (or simply LUN) 510 is a unique number that is provided to the host 20 by the disk control program 201 and is used for identifying each virtual volume 310 (the corresponding LU 122). In addition, the virtual LUN may be paraphrased as the virtual volume number (VV#). According to this embodiment, the virtual volume 310 is provided to the host 20 in a form corresponding to the LU 122. In other words, the host 20 can access the virtual volumes 310 by designating and managing the LUNs (the LU numbers) for file system management.

The size 520 is the capacity (size) of the virtual volume 310. The size 520, as described above, is a size (a virtual size) that is virtually provided to the host 20. For example, VV#1 having the virtual LUN of "01" has the size of 2 TB.

The storage destination TG number 530 represents TG134 (the storage destination TG) in which data of the virtual volume 310 is stored by the inactivation process. When there is no storage destination TG number 530 (no registration), the data is stored on the disk side.

The logical address (LBA) 540 represents an area (particularly, the page 311) of the virtual volume 310 corresponding to the address range (that is, the LBA range) of the segment 123 of the disk 121 (the LU 122). For example, "0-999" of the logical address 540 represents the range of 0 to 999 of the logical block address (LBA).

The page number 550 is a unique number that is used for identifying each page 311 included in the virtual volume 310. As described above, each page 311 is defined as the logical address 540 (the LBA range). For example, one page is formed by 1,000 blocks, and 1,000 blocks are configured as one segment.

The segment number 560 is a number that uniquely defines the real storage area (the segment 123 of the disk 121) that is managed in the disk pool management table 206. Accordingly, by referring to the segment number 560, the disk 121 (the LU 122) and the segment 123 for a page 311 of an LU 121 can be determined.

In the example represented in FIG. 7, the virtual volume 310 (the corresponding LU 122) having the virtual LUN 510 of "01" represents a virtual volume 310 (the LU 122) that is not stored in the TG 134 by the inactivation process, that is, data exists on the disk 121 side. In such a case, any value is not stored in the storage destination TG number 530 of the virtual volume. In addition, in the virtual volume, segment numbers 560 of the disk 121 are assigned only to pages 311 (for example, pages 1, 3, 4, and 6) for which data has been written (updated) by the host 20. In addition, the virtual volume 310 (the corresponding LU 122) having the virtual LUN 510 of "02" represents a virtual volume 310 that is stored in the TG 134 by the inactivation process. In such a case, in the storage destination TG number 530, for example, "10" is stored, and data of the virtual volume 310 is stored in the area of the TG 134 corresponding thereto. In addition, the virtual volume 310 (the corresponding LU 122) having the virtual LUN 510 of "03" represents that, after data of the virtual volume is stored in the TG 134 (the storage destination TG number 530 is "11") by the inactivation process, the page is disk-staged in accordance with the access from the host 20. For example, the pages 3, 4, and 5 of the virtual volume 310 (the LU 122) have been accessed from the host 20, and accordingly, only data of the pages 3, 4, and 5 is read out from the tape area on the disk 121.

Virtual Volume-Page Management Table

FIG. 8 represents an example of the configuration of the virtual volume-page management table 204. The virtual volume-page management table 204 manages the states of pages 311 of the virtual volume 310. The virtual volume-page management table 204 records a status 630 and a data state 640 of each page number 620, which represents the page 311, of the virtual LUN 610 that represents each virtual volume 310 (the corresponding LU 122).

The status 630 represents the data status of each page 311. For example, the status of a page 311 for which data has not been written by the host 20 is "unassigned". When a read command is received from the host 20 for the "unassigned" page, "0" (a response for error) is returned. In addition, for a page 311 for which data has been written (and the page is assigned) by the host 20, the status of the page is denoted by "active" in a case where the data is located on the disk 121. On the other hand, the status of the page is denoted by "inactive" in a case where the data is not located on the disk 121 and is stored, for example, in the tape 133.

The data state (update flag) 640 is denoted by "discord" (there is update) in a case where data on the disk 121 and data stored in the tape 133 are discordant as the data stored in the TG 134 is staged on the disk 121 and is updated. On the other hand, the data state for other cases is denoted by "accord" (there is no update).

Page Mapping Bit Map

FIG. 9 represents an example of the page mapping bit map 205. The page mapping bit map 205 represents whether the physical storage area (the segment 123) of the disk 121 is assigned for each page 311 of the virtual volume 310, by using a bit. In the figure, 701*a*, 701*b*, and the like are bits that represent the states in units of pages. For example, a page 1 denoted by 701*a* represents a state (bit "1") in which a segment 123 is assigned, and a page 2 denoted by 701*b* represents a state (bit "0") in which a segment 123 is not assigned. In addition, a configuration in which the content of the page mapping bit map 205 is integrated into the virtual volume-page management table 204 may be used.

By performing a control process by using the page mapping bit map 205, the resource of the tape 133 (the TG 134) can be saved. In other words, when data is copied from the disk 121 to the tape 133, the controller 110 copies not the data of the entire pages 311 of the LU 122 but only the page 311 of the state (the bit "1"), in which a segment 123 is assigned to the page, to the tape 133 side. In addition, the controller copies the content of the page mapping bit map 205 to the tape 133 side. Since the data of the page 311 of the bit "0" does not need to be copied, the area of the tape 133 can be saved as that much.

Disk Pool Management Table

Figure 10:
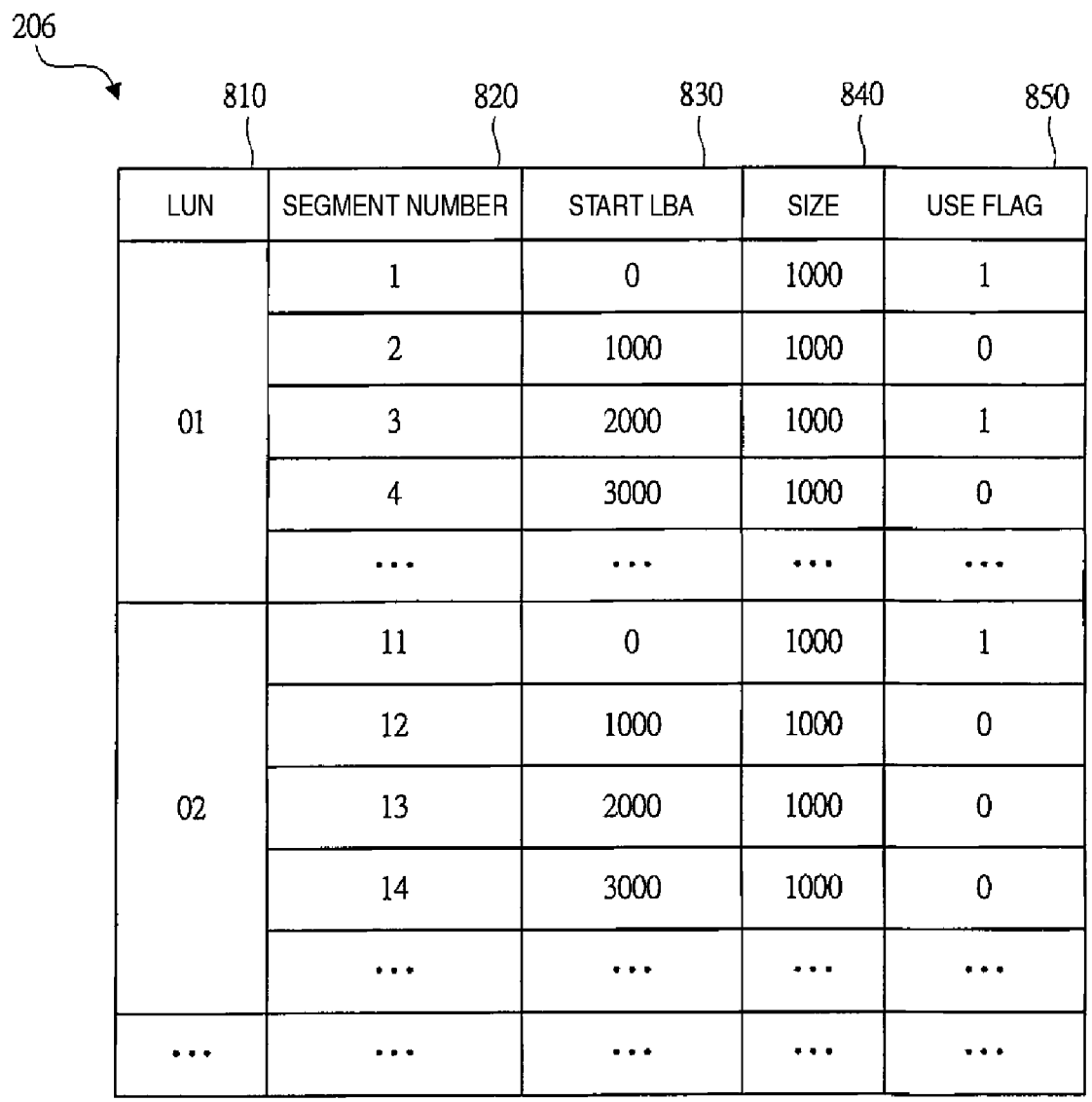
FIG. 10 is a diagram representing an example of the configuration of a disk pool management table.

FIG. 10 represents an example of the configuration of the disk pool management table 206. The disk pool management table 206 is used for managing the real storage area provided by the disk 121 (LU 122) as a disk pool 320. When a real storage area is needed in the virtual volume 310 for the controller 110 (when access (writing) from the host 20 is made), a real storage area (a segment 123) that can be assigned to the virtual volume 310 (the page 311) is selected from the disk pool 320, and the selected real storage area (the segment 123) is assigned to the virtual volume 310 (the page 311).

The disk pool management table 206 records an LUN (an internal LUN) 810, a segment number 820, a start LBA 830, a size 840, and a use flag 850.

The LUN 810 is a number (the LU number) used for identifying the LU 122 inside the virtual disk library device 10. The LUN 810, for example, is determined by the disk control program 201. The LUN 810 and the LU 122 are not limited to a configuration in which the LUN and the LU have one-to-one correspondence. Thus, by using general technology, a plurality of the LUNs 810 may be configured to be assigned to one LU 122 or one LUN 810 may be configured to be assigned to a plurality of the LUs 122.

The segment number 820 is a unique identification number for the disk control program 201 to manage the segment 123. A segment 123 that is represented by the segment number 820 is a minimum unit for dividing the area of the LU 122 (the disk 121) to be managed. The segment 123 is managed by the disk control program 201.

The start LBA 830 represents the physical position in which the segment 123 is started within the LU 122 specified by the LUN 810 as an LBA (in addition, the LBA may be defined in the range of the LBA as for the logical address 540). For example, the lead of the area of the LU 122 of which LUN 810 is "01" is the LBA "0" of the segment 123 of which segment number is "1".

The size 840 represents the size of the segment 123 in LBA units (the number of LBAs starting from the start LBA 830).

The use flag 850 represents the use status of the segment 123. For example, the use flag 850 represents whether the segment 123 is used by the disk control program 201 as a binary value. In such a case, when the segment is used, "1" is set in the use flag 850. On the other hand, when the segment is not used, "0" is set in the use flag.

In addition, although not shown in the disk pool management table 206, the LUN 810 (the LU 122) and the disk 121 (HDD identification information or the like) are corresponded to be managed by the controller 110.

TG Management Table

FIG. 11 represents an example of the configuration of the TG management table 207. The TG management table 207 manages data stored in the TG 134. The TG management table 207 records a TG number 910, a file mark interval 920, a tape number (configured tape number) 930, a storage LUN 940, an LU capacity 950, and a purge flag 960.

The TG number 910 is a unique number used for identifying the TG 134. In addition, the file mark interval 920 is an interval (for example, in units of GB) in which file marks (general technology) for determining the leading positions for reading data from the tape 133 are recorded in the tape 133. When data is written into the area of the tape 133 of the TG 134, file marks are written in correspondence with the file mark interval 920. Accordingly, when data is read from the tape 133 next time, cueing at the position of the file mark can be performed.

The tape number 930 is a number that uniquely identifying the tape 133 constituting the TG 134. In addition, the storage LUN 940 represents the LU 122 (the corresponding data) that is stored in the tape 133. The LU capacity 950 represents the capacity (size) of each LU 122 that is stored in the tape 133.

For example, in FIG. 11, of the TG 134 of "0001", in the tape 133 of "00001", data, which has the capacity of 500 GB, of the LU 122 of "0001" and, next, data, which has the capacity of 300 GB from the lead of the LU 122 of "0002" are stored. In addition, in the next tape 133 of "00002", continuing data, which has the capacity of 200 GB, of the LU 122 of "0002" and next, data, which has the capacity of 400 GB, of the LU 122 of "0003" are stored.

The purge flag 960 is initially set to "0". The purge flag represents a state in which the data of the LU 122 stored in the tape area can be purged (overwritten) as "1". When the purge flags of data of all the LUs 122 stored in the TG 134 are set to "1", the data of the TG 134 can be purged. In other words, the tape 133 constituting the TG 134 can be reused (overwritten) for other data.

In this example of the control process, when update for the data of the LU 122, of which purge flag 960 is "0", of the TG 134 is generated in accordance with access (writing) from the host 20, the controller 110 stores the data after update in an area of another TG 134 and sets the purge flag 960 of the original storage area to "1". When all the purge flags 960 are "1"s in units of TGs 134 (in a state in which storing all the other data of the TG 134 is completed), the TG 134 can be purged (reused).

By performing the control process by using the above-described purge flag 960, an advantage that a time required for a copy process is reduced can be acquired. In addition, differently from the above-described control process, a control process in which data is rewritten into the TG 134 that is the original position for update can be performed. In such a case, the time required for the copy process slightly increases. However, in the case, there is an advantage that the control process can be performed even in a case where there is no free TG 134.

TG Pool Management Table

FIG. 12 represents an example of the configuration of the TG pool management table 209. The TG pool management table 209 is used for managing the real storage area provided by the tape 133 as the TG pool 330. The TG pool management table 209 records registration TG numbers 1010 and use flags 1020 for a plurality of the TGs 134.

The registration TG number 1010 represents registration of the TG 134 identified by the registration TG number for archive use or the like that is an aspect of the invention. In addition, the use flag 1020 represents whether the TG 134 is used for the above-described use. When data of the virtual volume 310 is copied from the disk 121 (the LU 122) to the TG 134 (the tape 133), an unused TG 134 (having the use flag 1020 of "0") of a plurality of the TGs 134 registered in the TG pool 330 is used.

File System Management Table and File Management Table

FIG. 13 represents an example of the configuration of the file system management table 222, and FIG. 14 represents an example of the configuration of the file management table 221. The file management program 220 of the host 20 maintains and manages these tables 222 and 221 for managing directories and files and performs determination (a tape storage determining process, FIG. 15) on whether an inactivation command is issued based on the tables and the like. The directories are in correspondence with the LUs 122 (LUNs). The size of the LU 122 (the directory) is larger than that of a file.

The file system management table 222 records a directory 1110, a storage file system 1120, a path name 1130, a directory capacity 1140, a free capacity 1150, a tape storage threshold value 1160, and an LUN 1170. In addition, in the file management table 221, the latest access time 1240 of each file 1210 is recorded in addition to a file 1210, a storage file system 1220, and a path name 1230.

The directory 1110 is used by the file management program 220 for identification of the directory and is uniquely identified based on the storage file system 1120 and the path name 1130. In addition, the storage file system 1120 can uniquely identify the file system in which the directory exists. The path name 1130 is a path name of the directory in the file system. In addition, the directory capacity 1140 is the capacity of the directory (for example, in units of GB). The free capacity 1150 is a free capacity of the directory (for example, in units of GB). The tape storage threshold value 1160 is a threshold value used by the file management program 220 for determining (the tape storage determining process) whether the data of the directory is to be stored on the tape 133 side. The LUN 1170 is an LUN of the LU 122 corresponding to the directory.

As an example of the determination, the file management program 220 issues a tape storage directing command (the inactivation command) to the virtual disk library device 10 (the controller 110) in a case where the vacant capacity 1150 is smaller than the tape storage threshold value 1160 and all the files stored in the directory are determined not to have been accessed for a predetermined period or more based on the latest access time 1240.

A configuration in which the determination process is performed on the host 20 side has been described as above. However, a configuration in which the virtual disk library device 10 (the controller 110) side maintains the above-described management information 221 and 222 and performs the determination process may be used.

Next, a detailed example of each process (function) will be described. In descriptions below, when the subject of a process is omitted, the subject is the above-described program (a process executing the program) or the like.

Tape Storage Determining Process

Figure 15:
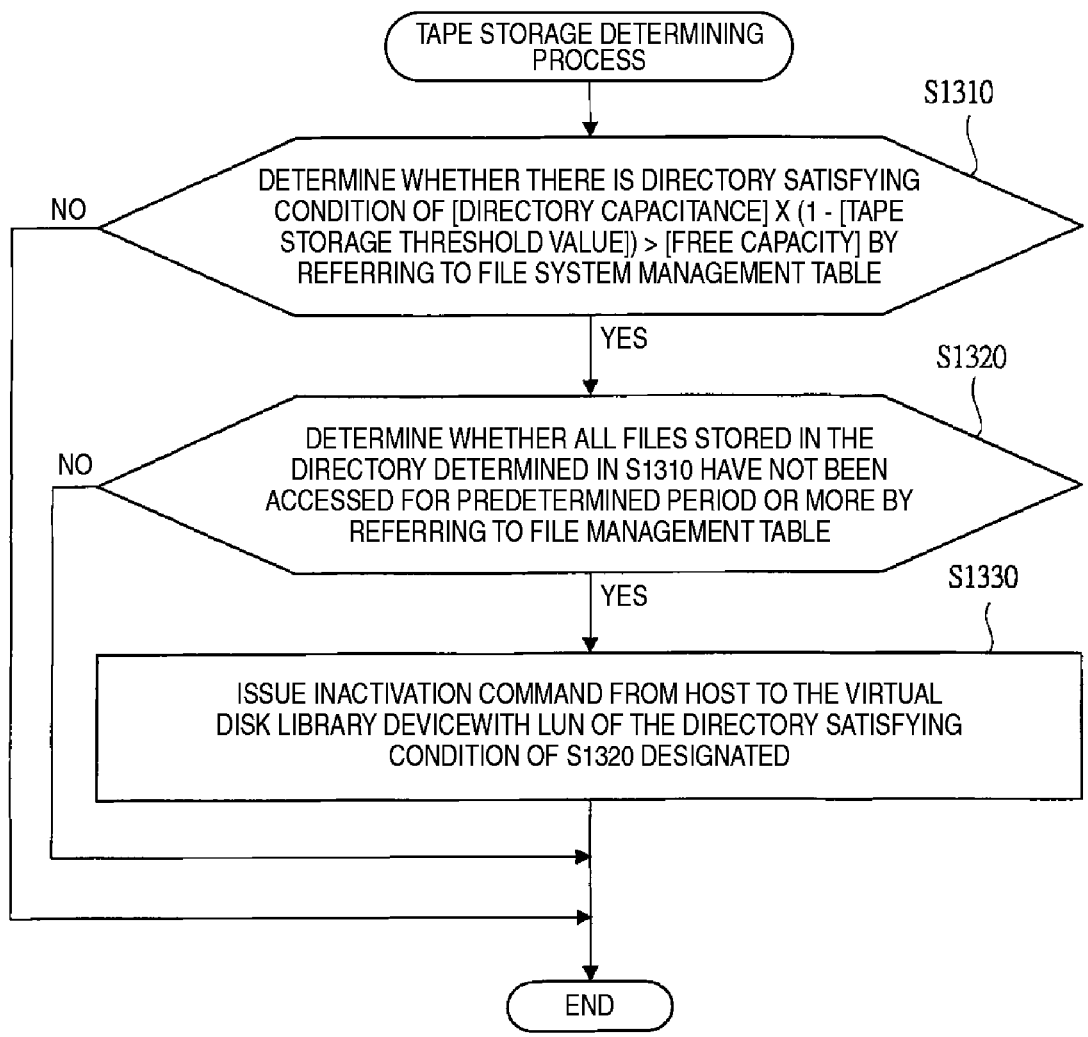
FIG. 15 is a diagram representing an example of the flow of a tape storage determining process.
Figure 16:
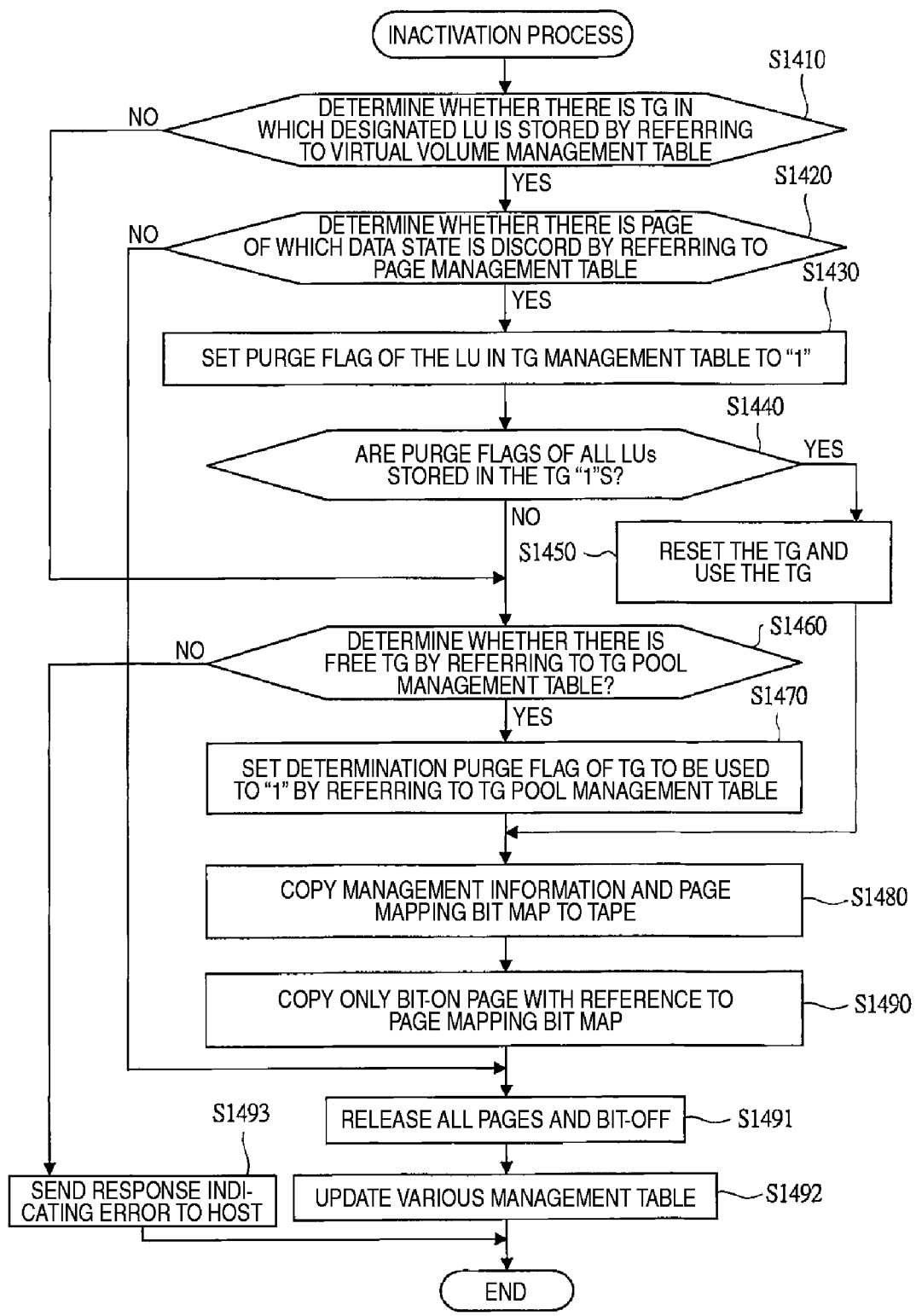
FIG. 16 is a diagram representing an example of the flow of an inactivation process.

FIG. 15 represents the flow of the tape storage determining process (the determining process triggering the inactivation process). The tape storage determining process is performed by the file management program 220 on the whole. In the flow, S represents a process step.

In S1310, a directory LU122 to be stored in the TG 134 is determined by using the file system management table 222. For example, when there is a directory satisfying the condition of "[directory capacity 1140]×(1−[tape storage threshold value 1160])>[vacant capacity 1150]", the process proceeds to S1320. On the other, when there is no directory satisfying the above-described condition, the process ends.

In S1320, when it is determined that all the files stored in the directory determined in S1310 have not been accessed for a predetermined period or more by using the file management table 221, the process proceeds to S1330. On the other hand, the process ends otherwise. For example, it is determined whether all the files of the directory have not been accessed for a half-year or one year or more. The data of the LU 122 (the virtual volume 310) corresponding to the files (the directories) is copied or moved from the disk 121 side to the tape 133 side, and thereby the storage cost of data can decrease.

In S1330, an LUN (the LUN 1170) corresponding to a directory (the directory 1110) satisfying the condition of the S1320 is designated based on the file system management table 222, and a direction (the inactivation command) is issued from the host 20 to the virtual disk library device 10. In the direction, information on the LU 122 for which the process is to be performed and the like are included.

The above-described tape storage determining process is performed at regular intervals, for example, once a month or the like. To all the directories determined in S1310 and S1320, the inactivation commands are issued, and the tape storage determining process ends.

Inactivation Process

FIG. 16 represents the flow of the inactivation process (a process for archiving data of the virtual volume 310 from the disk 121 side to the tape 133 side). The inactivation process is performed by the inactivation program 210 on the whole, triggered by reception of the direction (the inactivation command) in the virtual disk library device 10 from the file management program 220.

In S1410, it is determined whether there is the TG 134 in which the LU 122 designated by the direction (command) is stored by referring to the storage destination TG number 530 of the virtual volume management table 203. When there is the TG, the process proceeds to S1420. On the other hand, when there is not a TG 134, the process proceeds to S1460.

In S1420, it is determined whether there is a page, of which the data state 640 is "discord" (there is update), of the pages 311 of the LU 122 by referring to the virtual volume-page management table 204. When there is the page, the process proceeds to S1430. On the other hand, when there is not a page, the process proceeds to S1491.

In S1430, the purge flag 960 of the LU 122 is set to "1" in the TG management table 207.

In S1440, it is determined whether the purge flags of all the LUs 122 stored in the TG 134 in which the above-described LU 122 is stored are "1"s. When all the purge flags are "1"s, the process proceeds to S1450. On the other hand, the process proceeds to S1460 otherwise.

In S1450, the TG 134 is reset (data purge state), the TG 134 is used as the copy destination of the LU 122, and the process proceeds to S1480.

In S1460, it is determined whether there is a TG 134 (a free TG) of which use flag 1020 is "0" by referring to the TG pool management table 209. When there is the TG, the process proceeds to S1470. On the other hand, when there is not the TG, the process proceeds to S1493. In S1493, a response indicating an error is sent to the host 20 in S1493, and the process ends.

In S1470, one TG 134 (the free TG) of which use flag is "0" is selected by referring to the TG pool management table 209, and the selected one TG 134 is used as a copy destination of the LU 122. Then, the use flag of the TG 134 is changed to "1". For example, the TG 134 having the least TG number of the TGs 134 of which use flags are "0"s is selected.

In S1480, management information that is needed for staging data to the disk and the page mapping bit map 205 of the LU are copied to the tape.

In S1490, only bit-on (a state in which there is an assigned physical area) pages are copied to the tape by referring the page mapping bit map 205 of the LU. Accordingly, "0" data of pages (bit-off pages) that are not written is not needed to be stored in the tape from the host 20, and accordingly, the amount of usage of the tape can be decreased.

In S1491, after the copy process for all the pages is completed, segments assigned to the pages of the LU are released, and the page mapping bit map 205 is in the all bit-off state (a state in which a physical area is not assigned). Accordingly, the capacity stored in the tape and the disk physical area are released and can be reused for another virtual volume 310 or the like.

In S1492, various management tables are updated, and the process ends. For example, in the virtual volume management table 203, the storage destination TG number 530 is recorded, and all the segment numbers 560 are released. In addition, in the virtual volume-page management table 204, the active status 630 is changed to the inactive status. When there is a page of which data state 640 is "discord", the data state of the page is changed to "accord". In addition, in the disk pool management table 206, the use flag 850 of the segment assigned to the LU is changed to "0". In addition, in the TG management table 207, the file mark interval 920, the tape number 930, and the storage LUN 940, the LU capacity 950, and the purge flag 960 are recorded. As described above, the inactivation process is completed.

Disk Resident Function

In addition, in the inactivation process, when the inactivation command is issued from the host 20 to the virtual disk library device 10, a process (a disk-resident function in units of pages) for having an LBA range (corresponding pages) resident on a disk may be performed by designating the LBA range (the corresponding pages) to be resident on the disk. In such a case, instead of performing page release (purge) for the pages (disk-resident pages) corresponding to the designated LBA range, pages other than the above-described pages are controlled to be released. Accordingly, for example, by designating the LBA range in which meta data is stored at a time when the inactivation command is issued from the host 20, the data of the file can be stored in the tape with the meta data maintained on the disk.

Reading Process

Figure 17:
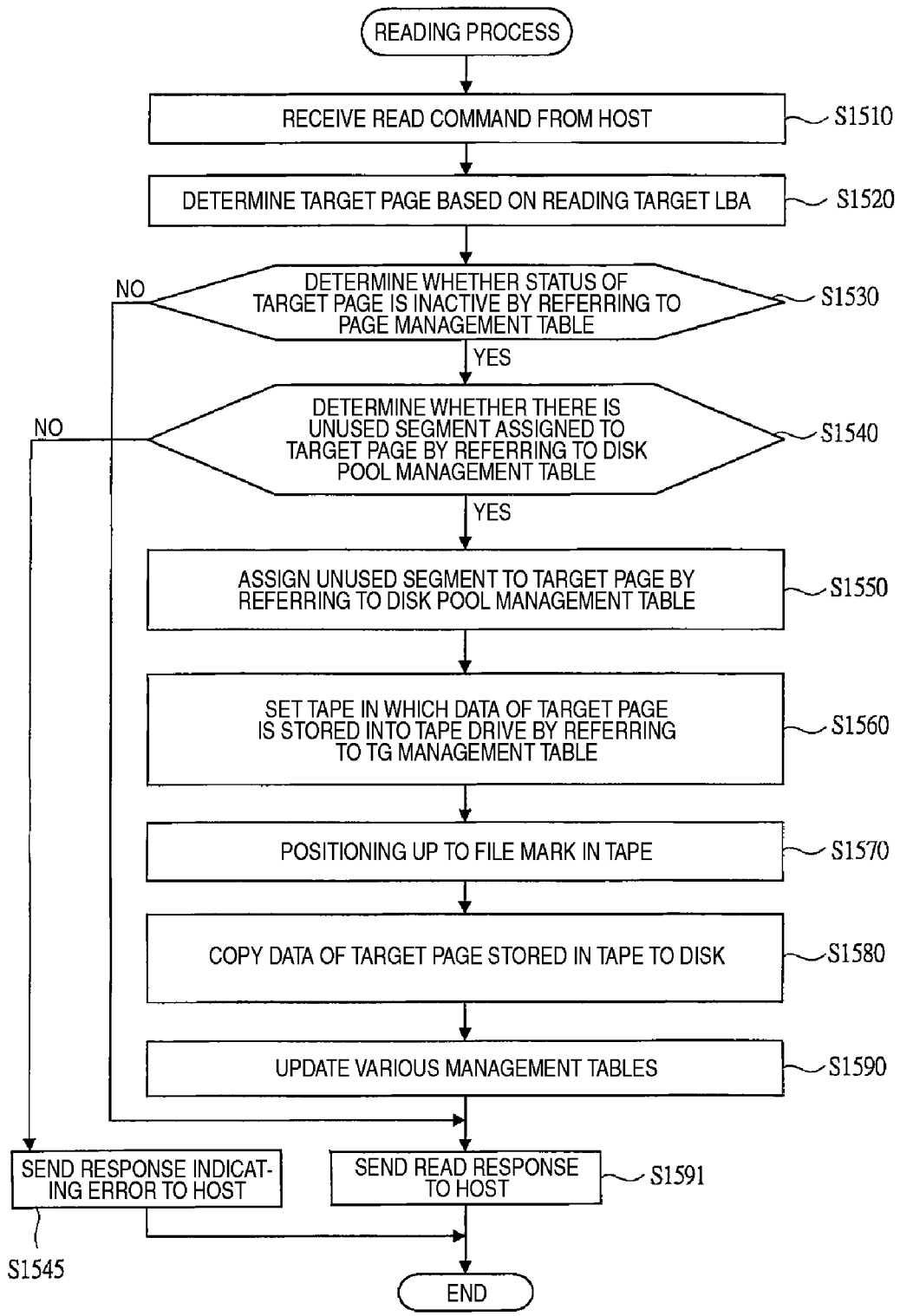
FIG. 17 is a diagram representing an example of the flow of a reading process.

FIG. 17 represents the process flow of the reading process. The reading process is performed by the disk control program 201 on the whole.

In S1510, the virtual disk library device 10 receives a read command from the host 20. In S1520, a target page (the page 311) is determined from the reading target LBA of the read command. For example, when the block size is 512 bytes and the page size is 32 MB, an LBA of 1 to 65536 forms page 1, an LBA of 65537 to 131072 forms page 2, and an LBA of 131073 to 196608 forms page 3.

In S1530, the status 630 of the target page is checked by referring to the virtual volume-page management table 204. When the status 630 is inactive, the process proceeds to S1540. On the other hand, when the status is not inactive, the process proceeds to S1591.

In S1540, it is determined whether there is an unused segment (the segment 123) that is assigned to the target page by referring to the disk pool management table 206. When there is an unused segment, the process proceeds to S1550. On the other hand, when there is not an unused segment, the process proceeds to S1545. In S1545, a response indicating an error is sent to the host 20, and the process ends.

In S1550, the unused segment is assigned to the target page by referring to the disk pool management table 206.

In S1560, the tape 133 in which the data of the target page is stored is set in the tape drive 132 by the robot 131 by referring to the TG management table 207. For the LU 122 that is stored in a plurality of the tapes 133, the tapes 133 in which the target page is stored can be determined by referring to the LU capacity 950 of the LU (the storage LUN 940) stored in each tape (the tape number 930) included in the TG management table 207.

In S1570, in driving the set target tape 133, positioning to the file mark located prior to the target page is performed.

In S1580, tape storage data is read from the position of the file mark of the target tape 133, and the data of the target page is copied into the segment of the disk side which is assigned in S1550. In addition, when the file mark interval 920 is not large, there is not a large difference between a time required for copying only the data of the area of the target page and a time for copying data of an area corresponding to the file mark interval. Accordingly, the data corresponding to the area of the file mark interval including the target page may be copied (staged).

In S1590, various management tables are updated. For example, the segment number 560 is recorded into the virtual volume management table 203. Then, in the virtual volume-page management table 204, the status 630 of the staged page is changed to be active. In the disk pool management table 206, the use flag 850 of the segment assigned in S1550 is changed to "1". In S1591, a read response is sent to the host 20 by using the data of the staged page, and the process ends.

Writing Process

Figure 18:
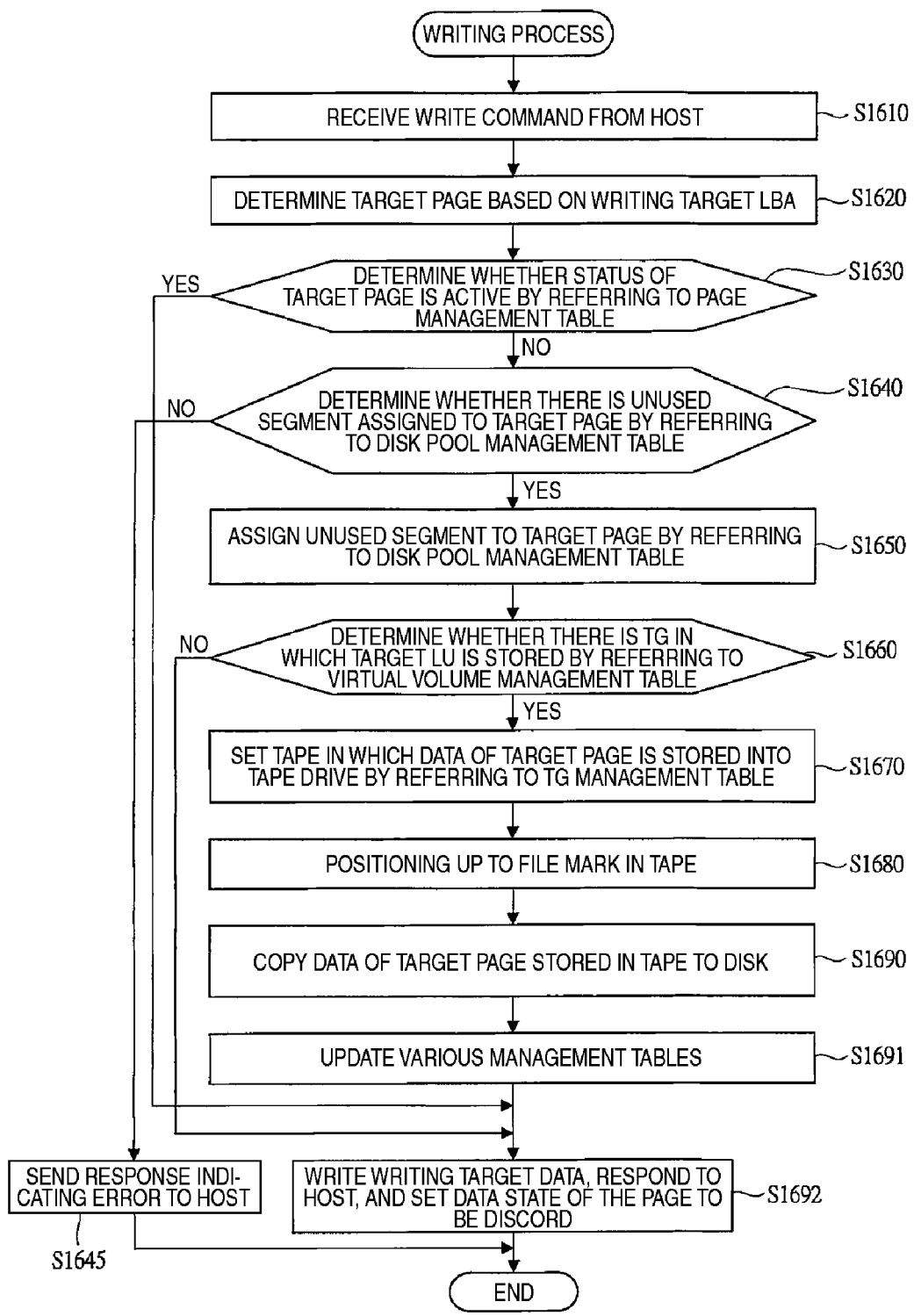
FIG. 18 is a diagram representing an example of the flow of a writing process.

FIG. 18 represents the process flow of the writing process. The writing process is performed by the disk control program 201 on the whole.

In S1610, the virtual disk library device 10 receives a write command from the host 20. In S1620, a target page is determined from the writing target LBA of the write command (the same as that of the reading process).

In S1630, the virtual volume-page management table 204 is referred. When the status 630 of the target page is active, the process proceeds to S1692. On the other hand, when the state is not active, the process proceeds to S1640.

In S1640, the disk pool management table 206 is referred to. When there is an unused segment that is assigned to the target page, the process proceeds to S1650. On the other hand, when there is not an unused segment, the process proceeds to S1645. In S1645, a response indicating an error is sent to the host 20.

In S1650, the unused segment is assigned to the target page by referring to the disk pool management table 206.

In S1660, the virtual volume management table 203 is referred to. When there is the TG 134 in which the target LU is stored, the process proceeds to S1670. On the other hand, when there is not the TG 134, the process proceeds to S1692.

In S1670, the tape 133 in which the data of the target page is stored is set in the tape drive 132 by the robot 131 by referring to the TG management table 207 (the same as in the reading process).

In S1680, in driving the set target tape 133, positioning to the file mark located prior to the target page is performed.

In S1690, tape storage data is read from the position of the file mark of the target tape 133, and the data of the target page is copied into the segment assigned in S1650 (the same as in the reading process).

In S1691, various management tables are updated. For example, the segment number 560 is recorded into the virtual volume management table 203. Then, in the virtual volume-page management table 204, the status 630 of the staged page is changed to be active. In the disk pool management table 206, the use flag 850 of the segment assigned in S1550 is changed to "1".

In S1692, a write response is sent to the host 20 by using the staged page. In other words, the write target data is written into the page. Then, the data state 640 of the page of the virtual volume-page management table 204 is changed to "discord", and the process ends.

Update Process for Tape Storage Data

An update (update reflected) process for the tape storage data is implemented by performing the writing process after the reading process. By performing the process of S1692, the data state 640 of the virtual volume-page management table 204 is managed to be "discord" (there is update).

A process for storing (update-reflecting) the data (update completed) of the target page of the LU of the disk side to the tape side is performed by performing the inactivation process again, triggered by no access for a predetermined period, a re-storing direction from the host 20, or the like.

In such a case, in general technology, disk staging for the remaining pages (data of un-updated pages other than the target page) of the LU is needed for sequentially writing the data into the tape. Accordingly, only the target page cannot be written into the tape 133. In the general technology, in order to update the page data and store the page data into the tape, a total of two copy processes including a copy process from the tape to the disk and a copy process from the disk to the tape is needed to be performed for copying data in units of the LUs, and therefore a total process time increases.

Alternatively, in general technology, disk staging for the tape storage data in units of the LUs is needed to be completed prior to the access from the host by issuing a disk staging directing command (a disk staging process) or the like. However, in such a case, a load for the host becomes high.

Thus, in this embodiment, the remaining pages of the LU are staged on the disk prior to re-inactivation process (storing data in the tape again) by performing the prior staging process. Accordingly, when the re-inactivation process triggered by the above-described operations is performed, the prior staging is completed. Thus, a new disk staging process is not needed, and immediately storing data in the tape in units of LUs can be performed. Therefore, the whole process time can be decreased.

Prior Staging Process

Figure 19:
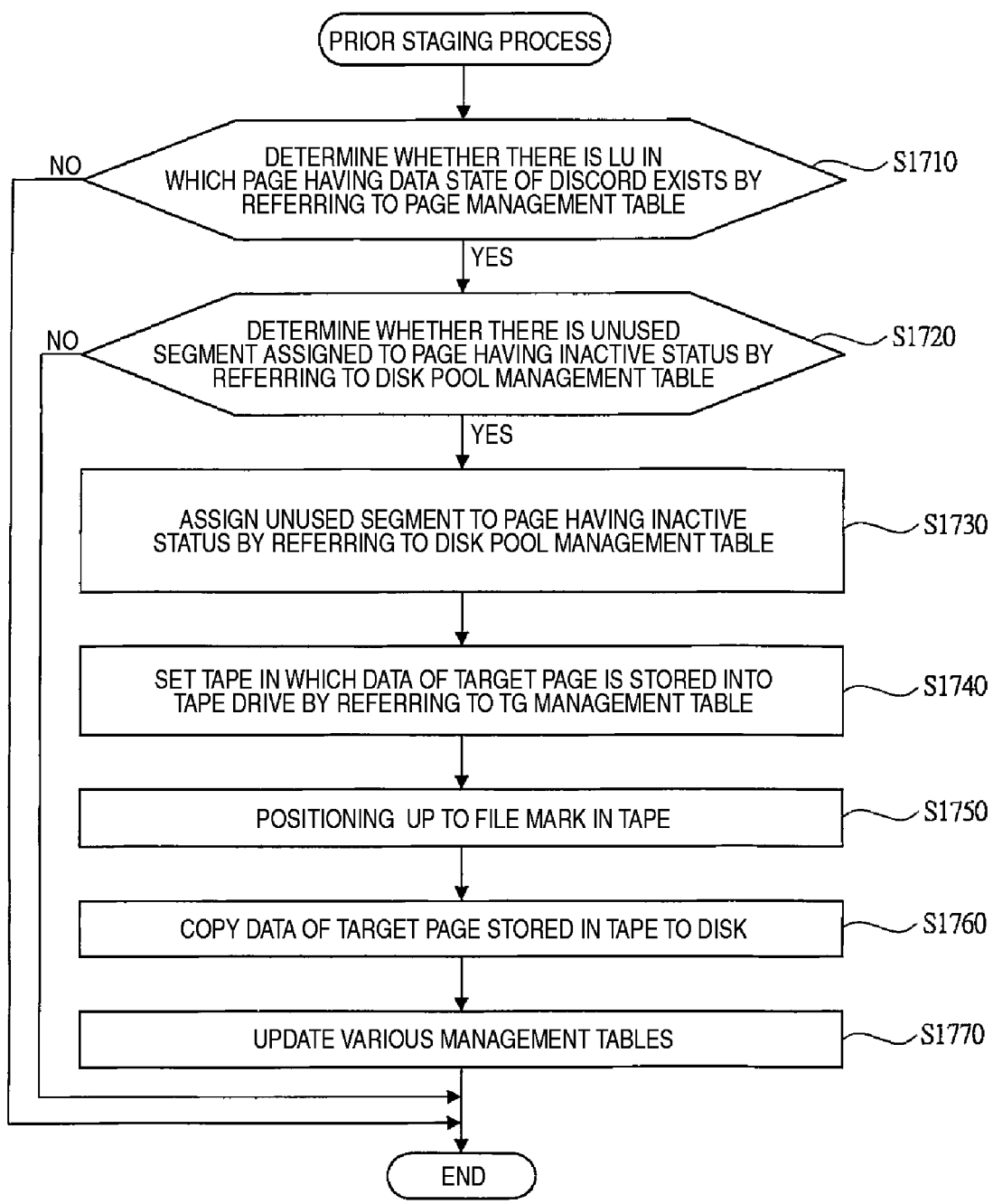
FIG. 19 is a diagram representing an example of the flow of a prior staging process.

FIG. 19 represents the flow of the prior staging process. The prior staging process is performed by the disk control program 201 on the whole.

In S1710, it is determined whether there is an LU in which a page, of which the data state 640 is "discord", is included by referring to the virtual volume-page management table 204. When there is the page, the process proceeds to S1720. On the other hand, when there is not the page, the process ends.

In S1720, it is determined whether there is an unused segment assigned to a page of which status 630 is "inactive" in each page of the LU by referring to the disk pool management table 206. When there is the unused segment, the process proceeds to S1730. On the other hand, when there is not the unused segment, the process ends.

In S1730, the unused segment is assigned to the page, of which status 630 is "inactive", of pages of the LU by referring to the disk pool management table 206.

In S1740, the tape 133 in which the data of the target page is stored is set in the tape drive 132 by the robot 131 by referring to the TG management table 207. By referring to the TG management table 207, the tape 133 in which the target page is stored can be determined.

In S1750, in driving the set target tape 133, positioning to the file mark located prior to the target page is performed.

In S1760, the data of the target page of the target tape 133 is copied into the segment assigned in S1730.

In S1770, various management tables are updated. For example, the segment number 560 is recorded into the virtual volume management table 203. Then, in the virtual volume-page management table 204, the status 630 of the staged page is changed to be active. In the disk pool management table 206, the use flag 850 of the segment assigned in S1550 is changed to "1".

The above-described prior staging process of FIG. 6A is for a case where the prior staging process is started in the background of the disk staging process of FIG. 5B. However, the prior staging process may be completed until the re-inactivation process (FIG. 6B) is performed. Accordingly, for example, the prior staging process may be performed in a time frame such as night time in which performance of the virtual disk library device 10 is sufficient (in such a case, the timing for directing the re-inactivation process is in units of one day or the like).

Embodiment 2

Figure 20:
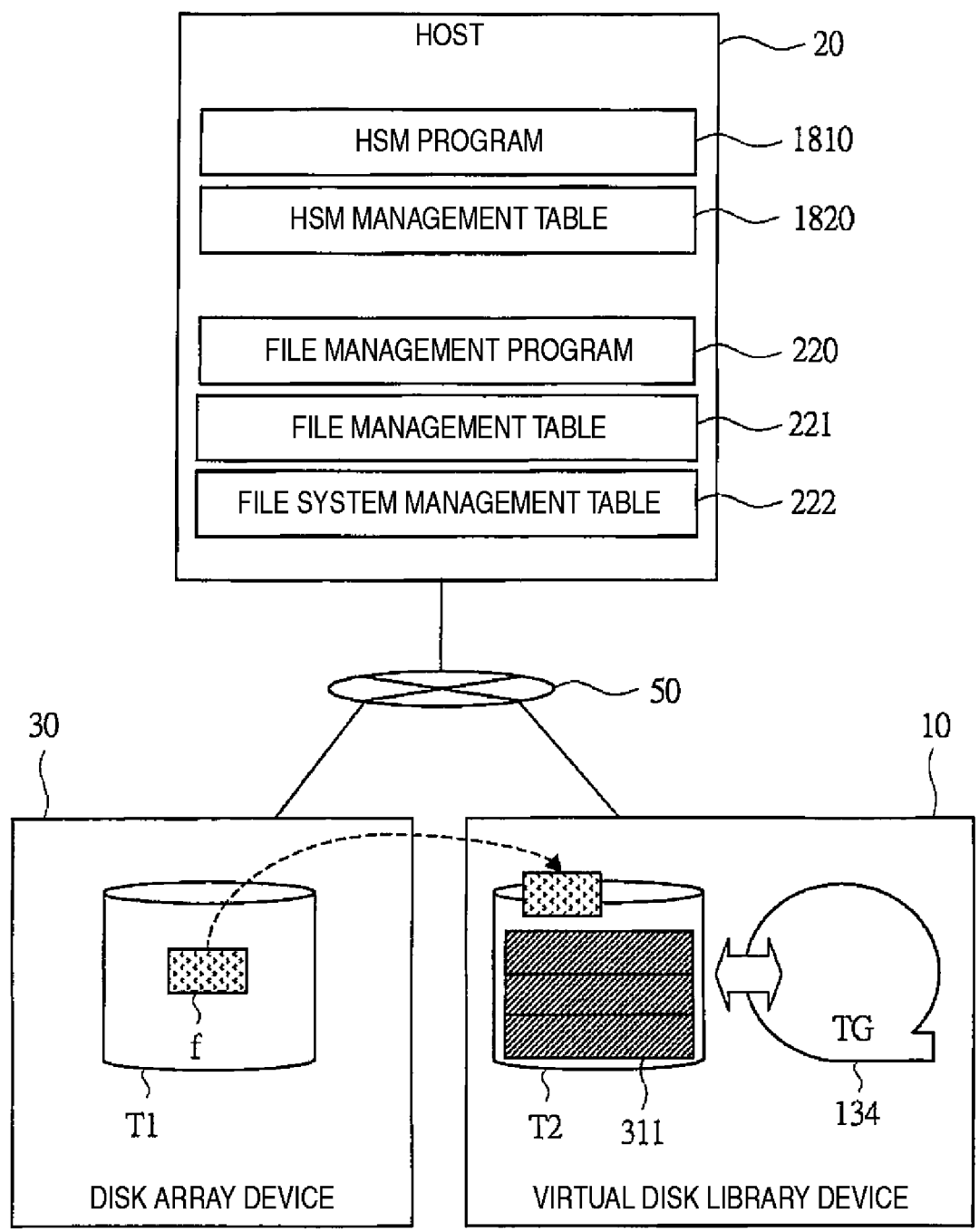
FIG. 20 is a diagram representing an example of the configuration of a computer system according to Embodiment 2 of the present invention.

Next, a computer system according to Embodiment 2 of the invention will be described with reference to FIG. 20. Embodiment 2 and thereafter are modified examples of Embodiment 1.

According to the configuration of an embodiment of the invention, basically, data that is scarcely accessed is processed to be stored (the inactivation process) not on the disk side but the tape side, and accordingly, the cost of storing the data decreases. As exemplified in Embodiment 1, for a case where the file stored in the directory is not accessed for a predetermined period and the free capacity exceeds the threshold value or the like, the inactivation process is performed by issuing the inactivation command from the host 20 to the virtual disk library device 10 with the LUN corresponding to the directory designated.

Accordingly, the directories (the LU 121 corresponding to the virtual volume 310) of the virtual disk library device 10 are sequentially used, and storing data into the tape can be efficiently performed in a case where a file not to be accessed is stored (a case where files are optimally disposed).

Accordingly, according to Embodiment 2, in a system including a "hierarchical storage management" (HSM) program in the host 20, the optimal disposition of files is controlled by the host 20 by using technology of HSM. As a result, storing data into the tape can be effectively performed.

The "hierarchical storage management (HSM)" is technology in which a plurality of file systems having different performances or functions is configured as one file system and data is moved between the file systems in accordance with the use status of the files.

In Embodiment 2, an HSM program 1810, an HSM management table 1820, a file management program 220, a file management table 221, and a file system management table 222 are included in a host 10. The host 10 is connected to a disk array device 30 and a virtual disk library device 10 through a fibre channel (network) 50.

Figure 21:
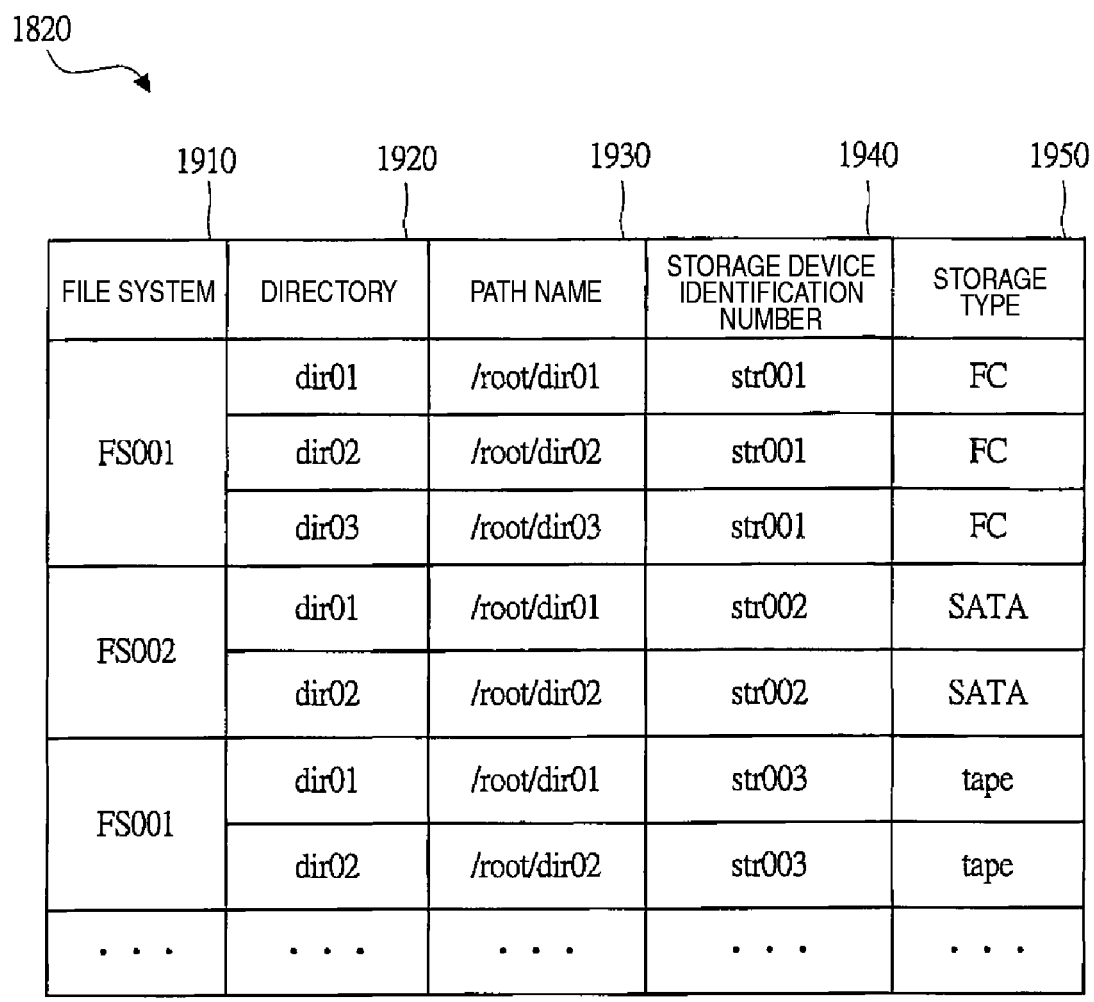
FIG. 21 is a diagram representing an example of the configuration of an HSM management table.

FIG. 21 represents an example of the configuration of the HSM management table 1820. The HSM management table 1820 records a file system 1910, a directory 1920, a path name 1930, a storage device identification number 1940, and a storage type 1950. The file system 1910 is used by the HSM program 1810 for uniquely identifying the file system. In addition, the directory 1110 is used by the HSM program 1810 and the file management program 220 for identifying the directory. The path name 1930 is a path of the directory in the file system. In addition, the storage device identification number 1940 is used for uniquely identifying a storage device (a storage destination of data of the file system) that configures the file system. The storage type 1950 determines the attribute of the storage and allows setting of different policies for each storage type 1950. The storage type 1950, for example, is an "FC (Fibre Channel)", a "SATA (Serial ATA)", a "tape (Tape)", or the like.

The HSM program 1810 performs optimal disposition of files for the resources of the virtual disk library device 10 by using the management information 1820, 221, and 222. For example, a file f that has not been accessed for a predetermined period or more is moved from the disk array device 30 (for example, a first virtual volume T1 therein) to the virtual disk library device 10 (for example, a second virtual volume T2 therein). In such a case, the HSM program 1810 moves the file to a directory, of which directory name is the smallest, of the directories 1100 having the storage type 1950 of "tape" and the free capacity 1150 that does not exceed the tape storage threshold value 1160 by referring to the HSM management table 1820 and the file system management table 222. For example, when there are "dir01" and "dir02", "dir01" is selected. In addition, for example, when there are "adir01" and "bdir01", "adir01" is selected. The purpose of the selection is for sequentially using the directories LUs, and thus, the use order is determined based on the directory names. When the free capacity 1150 exceeds the tape storage threshold value 1160 in accordance with movement of the file f, storage of the data in the tape is performed by issuing an inactivation command with the LUN designated, as in Embodiment 1.

As described above, by using the HSM program 1810, the directories (the LUs 122 corresponding to the virtual volume 310) of the virtual disk library device 10 that performs storage of data in the tape are sequentially used, and storage of data from the disk to the tape can be effectively performed in accordance with optimal disposition (data is continuously disposed in the address space of the virtual volume) of files.

As a detailed example of the configuration of Embodiment 2, the host system 20 has a client and an NAS (Network Attached Server). To the NAS, the disk array device 30 and the virtual disk library device 10 are connected. The NAS includes the HSM program 1810 and has a file system that is managed hierarchically. The data of the file f is moved from the first virtual volume T1 of the disk array device 30 to the second virtual volume T2 of the virtual disk library device 10 and is sequentially stored in the first virtual volume T1.

In the HSM management process of the host 20, for movement of the data of the file f from T1 to T2, the file f is moved from the first file system to the second file system, and the HSM management table 1820 is updated. When T2 is full of file data, the above-described direction (the inactivation command) is issued by the NAS to the virtual disk library device 10 with the LUN designated. Accordingly, in the virtual disk library device 10, data is copied (archived) from the disk to the tape in units of LUs. The page of T1 after being archived is released. When file access from the client is made, the NAS side issues a file read command to the virtual disk library device 10, for example, by extending the time-out period. Then, the virtual disk library device 10 performs a disk staging process in units of pages and responds to the host (client) side.

As described above, according to each of the above-described embodiments of the invention, a process for copying data between the disk and the tape can be effectively performed in units of LUs and pages, and a response for the host can be made at a high speed.

The above-described process units (functions) can be implemented by hardware, a computer program, or a combination thereof. The program is read and executed by a predetermined processor. At that moment, a storage area that exists on the hardware resource such as a memory may be used appropriately. In addition, the program may be installed to the computer from a recording medium such as a CD-ROM and may be downloaded through a communication network.

As above, the invention made by inventors has been described in detail based on the embodiments. However, the invention is not limited to the above-described embodiments, and it is apparent that the embodiments can be changed in various manners without departing from the gist of the invention.

The invention may be applied to a computer system including both a disk device and a tape device and the like.

What is claimed is:

1. A data archive system that is used by a computer, the archive system comprising a storage control unit which processes an access command from the computer and to which a first-type storage device group that is a random access type and a second-type storage device group that is a sequential access type are built in or connected, wherein the storage control unit performs:
a process for setting one or more logical storage areas in which data can be stored in one or more of the first-type storage device;
a process for managing a plurality of units of pages that has a size smaller than that of units of the logical storage area such that they correspond with the units of the logical areas and managing a first real storage area of the first-type storage device or a second real storage area of the second-type storage device such that they correspond with the pages as a real storage area;
a process for moving or copying data in the units of the logical storage areas from the first real storage area of a first-type storage device to a second real storage area of the second-type storage device in accordance with a predetermined determination or a predetermined direction;
a process for reading out data from an area of the second real storage area of the second-type storage device corresponding to a page including target data in the units of the pages to be in the first real storage area of the first-type storage device and responding to the computer in a case where the target data for access is stored on the second-type storage device when an access command for reading or writing the data of the logical storage area is received from the computer;
a process for reading out data from an area of the second real storage area of the second-type storage device corresponding to remaining pages of the logical storage area other than the page including the target data to be in the first real storage area of the first-type storage device, in the background of or after the process for reading out data and responding to the computer; and
a process for storing data in the units of the logical storage areas including updated pages in the second real storage area of the second-type storage device at a time when the data of the logical storage area updated by the computer in accordance with the process for reading out data and responding to the computer or access thereafter is to be stored again in the second real storage area of the second-type storage device from the first real storage area of the first-type storage device, triggered by the predetermined determination or the predetermined direction.

2. A data archive system comprising:
a computer; and
a storage control device used by the computer,
wherein the storage control device, to which a first-type storage device group that is a random access type and a second-type storage device group that is a sequential access type are built in or connected, performs:
a process for setting one or more logical storage areas in which data can be stored in one or more of the first-type storage devices;
a process for setting a group in which data of the logical storage area can be stored in one or more of the second-type storage devices;
a process for providing the computer a virtual volume configured by units of a plurality of pages that have a predetermined size smaller than that of units of the logical storage areas;
a process for managing the logical storage areas such that they correspond with the virtual volume and managing the first real storage area of the logical storage area of the first-type storage device or the second real storage area of the group of the second-type storage device such that they correspond with pages of the virtual volume as a real storage area;
a first process for moving or copying the data of the virtual volume in the units of the logical storage areas from the first real storage area of the logical storage area of the first-type storage device to the second real storage area of the group of the second-type storage device in accordance with a predetermined determination or a predetermined direction;
a second process for moving or copying the data of the real storage area of the virtual volume in the units of the logical storage areas from the second real storage area of the group of the second-type storage device to the first real storage area of the logical storage area of the first-type storage device in accordance with the predetermined determination or the predetermined direction;
a third process for reading out data from an area of the second real storage area of the second-type storage device corresponding to a page including target data in the units of the pages to be in the first real storage area of the first-type storage device and responding to the computer in a case where the target data for access is stored on the second-type storage device when an access command for reading or writing the data of the logical storage area is received from the computer;
a fourth process for reading out data from an area of the second real storage area of the group of the second-type storage device corresponding to remaining pages of the logical storage area other than the page including the target data to be in the first real storage area of the logical storage area of the first-type storage device, in the background of or after the third process; and
fifth process for storing data in the units of the logical storage areas including updated pages in the second real storage area of the group of the second-type storage device at a time when the data of the virtual volume updated by the computer in accordance with the third process or access thereafter is to be stored again in the second real storage area of the second-type storage device from the first real storage area of the first-type storage device, triggered by the predetermined determination or the predetermined direction.

3. The data archive system according to claim 2, wherein the storage control device manages status information that represents the status of assignment of the real storage area and data state information that represents accord or discord of contents of data of the first-type storage device and data of the second-type storage device, for each page of the virtual volume.

4. The data archive system according to claim 2,
wherein the storage control device manages a purge flag for each data of the logical storage area which is stored in the second-type storage device,
wherein the storage control device turns off the purge flag at a time when the first process is performed in which data from the first real storage area is stored in the second real storage area;
wherein the storage control device stores updated data in a second-type storage device different from the second-type storage device as a storage source at a time when the data read out from the second real storage area to be in the first real storage area is updated and the updated data is to be stored in the second-type storage device and turns on the purge flag of the storage source, and
wherein the storage control device releases the group to be usable for other data in a case where the all purge flags of the group are turned on.

5. The data archive system according to claim 2, wherein the storage control device manages whether data is stored in each of the pages of the virtual volume as a bit map and performs a process for storing the data of the page in which the data is stored by referring to the bit map at a time when the data of the virtual volume from the first-type storage device is stored on the second-type storage device.

6. The data archive system according to claim 2, wherein, when the data of the logical storage area from the first-type storage device is stored in the second-type storage device, a process is performed for having the data of the page, which is designated by the computer, of the logical storage area to be resident on the first real storage area of the first-type storage device.

7. The data archive system according to claim 2, wherein the computer performs:
a process for managing a file system such that they correspond with the virtual volume or the logical storage area; and
a process for determining whether the first process in which the data of the virtual volume or the logical storage area is moved from the first real storage area to the second real storage area is to be performed and issuing a direction for performing the first process to the storage control device in a case where the first process is determined to be performed.

8. The data archive system according to claim 7,
wherein the computer issues a command having a timeout period longer than that for a case where the first-type storage device is accessed in a case where the second-type storage device is accessed when data of the virtual volume or the logical storage area is accessed, and
wherein the storage control device performs a response process for the computer within the timeout period in a case where the data of the second-type storage device is accessed.

9. The data archive system according to claim 2,
wherein the computer configures a plurality of different file systems as one file system and performs a hierarchical storage management process in which data is moved among the file systems in accordance with a use status of a file,
wherein the computer performs a process for optimally disposing files by sequentially storing files, which have not been accessed for a predetermined period or more, among files that are stored in storage resources of the storage control device from the computer in an address space of the virtual volume, and
wherein the storage control device, when a specific virtual volume is full of files that have not been accessed for the predetermined period or more, performs the first process for data of the logical storage area corresponding to the virtual volume.

10. A data archive system comprising:
a computer including a file system; and
a virtual disk library device that is used by the computer,
wherein the virtual disk library device includes:
a controller;
a disk array device that includes a magnetic disk device group that is a first-type storage device group of a random access type; and
a tape library device that includes a magnetic tape device group that is a second-type storage device group of a sequential access type,
wherein the controller includes:
a processor:
a control memory;
a front-end interface (I/F) unit that is a communication I/F for the computer;
a first communication I/F unit that is a communication I/F for the magnetic disk device group;
a second communication I/F unit that is a communication I/F for the magnetic tape device group; and
a cache memory,
wherein the controller performs:
a process for setting one or more logical storage areas in which data can be stored in one or more of the magnetic disk devices;
a process for setting a group in which data of the logical storage area can be stored in one or more of the magnetic tape devices;
a process for providing the computer a virtual volume configured by units of a plurality of pages that have a predetermined size smaller than that of units of the logical storage areas;
a process for managing the logical storage areas such that they correspond with the virtual volume and managing a first real storage area of the logical storage area of the magnetic disk device or a second real storage area of the group of the magnetic tape device such that they correspond with pages of the virtual volume as a real storage area;
a first process for moving or copying the data of the virtual volume in the units of the logical storage areas from the first real storage area of the logical storage area of the magnetic disk device to the second real storage area of the group of the magnetic tape device in accordance with a predetermined determination or a predetermined direction;
a second process for moving or copying the data of the real storage area of the virtual volume in the units of the logical storage areas from the second real storage area of the group of the magnetic tape device to the first real storage area of the logical storage area of the magnetic disk device in accordance with the predetermined determination or the predetermined direction;

a process for caching data by using the cache memory in the first and second processes; and a third process for reading out data from an area of the second real storage area of the magnetic tape device corresponding to the page including target data in the units of the pages to be in the first real storage area of the magnetic disk device and responding to the computer in a case where the target data for access is stored on the magnetic tape device when access command for reading or writing the data of the virtual volume or the logical storage area is received from the computer;

wherein the controller performs a fourth process for reading out data from an area of the second real storage area of the group of the magnetic tape device corresponding to remaining pages of the logical storage area other than the page including the target data to be in the first real storage area of the logical storage area of the magnetic disk device, in the background of or after the third process, wherein the controller performs a fifth process for storing data in the units of the logical storage areas including updated pages in the second real storage area of the group of the magnetic tape device at a time when the data of the virtual volume updated by the computer in accordance with the third process or access thereafter is to be stored again in the second real storage area of the magnetic tape device from the first real storage of the magnetic disk device, triggered by the predetermined determination or the predetermined direction.

* * * * *